US011091158B2

(12) United States Patent
Berntorp et al.

(10) Patent No.: US 11,091,158 B2
(45) Date of Patent: *Aug. 17, 2021

(54) SYSTEM AND METHOD FOR CONTROLLING MOTION OF VEHICLE WITH VARIABLE SPEED

(71) Applicant: Mitsubishi Electric Research Laboratories, Inc., Cambridge, MA (US)

(72) Inventors: Karl Berntorp, Watertown, MA (US); Claus Danielson, Somerville, MA (US); Avishai Weiss, Cambridge, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 471 days.

This patent is subject to a terminal disclaimer.

(21) Appl. No.: 16/016,613

(22) Filed: Jun. 24, 2018

(65) Prior Publication Data

US 2019/0389459 A1    Dec. 26, 2019

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *B60W 30/18163* (2013.01);
(Continued)

(58) Field of Classification Search
USPC ........................................................ 701/23
See application file for complete search history.

(56) References Cited

U.S. PATENT DOCUMENTS 8,543,261 B2     9/2013  Anderson et al.
2005/0216181 A1*  9/2005  Estkowski ........... G05D 1/0212
                                                701/411
(Continued)

FOREIGN PATENT DOCUMENTS

WO      2018179533 A2    10/2018

OTHER PUBLICATIONS

McNaughton et al. ("Motion planning for autonomous driving with a conformal spatiotemporal lattice," 2011 IEEE International Conference on Robotics and Automation, Shanghai, 2011, pp. 4889-4895) (Year: 2011).*

(Continued)

*Primary Examiner* — Aniss Chad
*Assistant Examiner* — Mahmoud M Kazimi
(74) *Attorney, Agent, or Firm* — Gennadiy Vinokur; Hironori Tsukamoto

(57) ABSTRACT

A control system of a vehicle for controlling motion of the vehicle traveling on a road shared with a set of moving objects include a memory to store a set of regions of states of lateral dynamic of the vehicle corresponding to a set of equilibrium points. Each region defines a control invariant set of the states of the lateral dynamic determined for different speeds of the vehicle, such that the vehicle having a state within a region determined for a speed is capable to maintain its states within the region while moving with the speed. Each region includes a corresponding equilibrium point and intersects with at least one adjacent region. Each equilibrium point is associated with one or multiple regions determined for different speeds. A collision detector to detect a collision of each region with at least one object at each time step of control in a time horizon when a trajectory of the object at the time step of control intersects a space defined by a longitudinal displacement of the vehicle at the
(Continued)

time step of control and a range of values of the lateral displacement of the region to produce a data structure indicating a collision-free region at different time steps of control. A path planner determines a time sequence defining a collision free sequence of regions forming a union of regions in space and time connecting a region including an initial displacement with a region including a target displacement to produce a trajectory within the union connecting the initial displacement with the target displacement. A controller controls the vehicle according to the trajectory.

15 Claims, 42 Drawing Sheets

(51) Int. Cl.
    *B60W 30/18*     (2012.01)
    *B60W 50/00*     (2006.01)
    *G05D 1/02*     (2020.01)
    *G08G 1/16*     (2006.01)

(52) U.S. Cl.
    CPC ....... *B60W 50/0097* (2013.01); *G05D 1/0214* (2013.01); *G05D 1/0223* (2013.01); *B60W 2520/06* (2013.01); *B60W 2520/10* (2013.01); *B60W 2520/12* (2013.01); *B60W 2554/00* (2020.02); *B60W 2720/10* (2013.01)

(56) References Cited

U.S. PATENT DOCUMENTS

| | | | |
|---|---|---|---|
| 2012/0109610 A1* | 5/2012 | Anderson | B60W 50/0098 703/8 |
| 2016/0010957 A1 | 1/2016 | Beechey et al. | |
| 2016/0109571 A1* | 4/2016 | Zeng | G01S 13/87 342/71 |
| 2016/0327953 A1* | 11/2016 | Nilsson | B60W 30/16 |
| 2018/0129203 A1* | 5/2018 | Tafti | G05D 1/0005 |

OTHER PUBLICATIONS

J. Ziegler et al. (Spatiotemporal state lattice for fast trajectory planning in dynamic on-road driving scenario, ; 2009 IEEE/RSJ International Conference on Intelligent Transportation Systems, vol. 15, No. 15, pp. 2063-2073; Oct. 2014) (Year: 2014).*

M. Schreier, V. Willert, "An Integrated Approach to Maneuver-Based Trajectory Prediction and Criticality Assessment in Arbitrary Road Environment," IEEE Transactions on Intelligent Transportation System, vol. 17, No. 10, pp. 2751-2766, Oct. 2016 (Year: 2016).*

Wang et al., (Vehicle Localization with Global probability Density Function for Road Navigation, 2007 IEEE Intellientvehicles Symposium, Isntabul, 2007, pp. 1033-1038) (Year: 2007).*

* cited by examiner

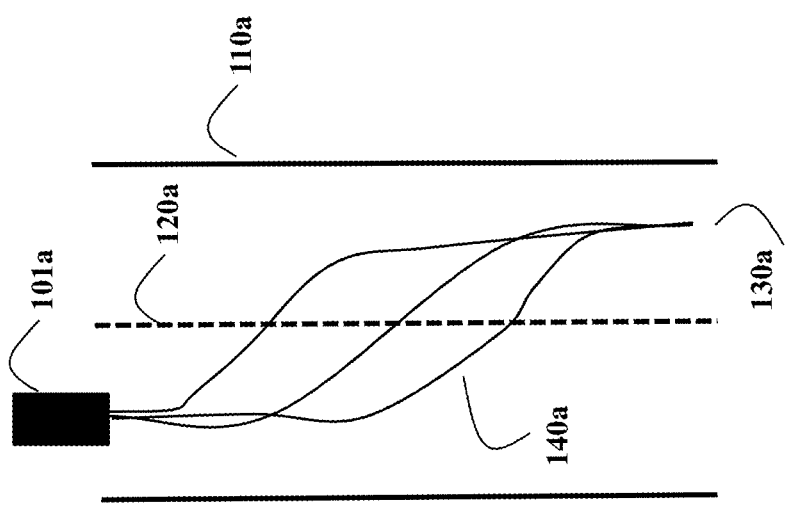

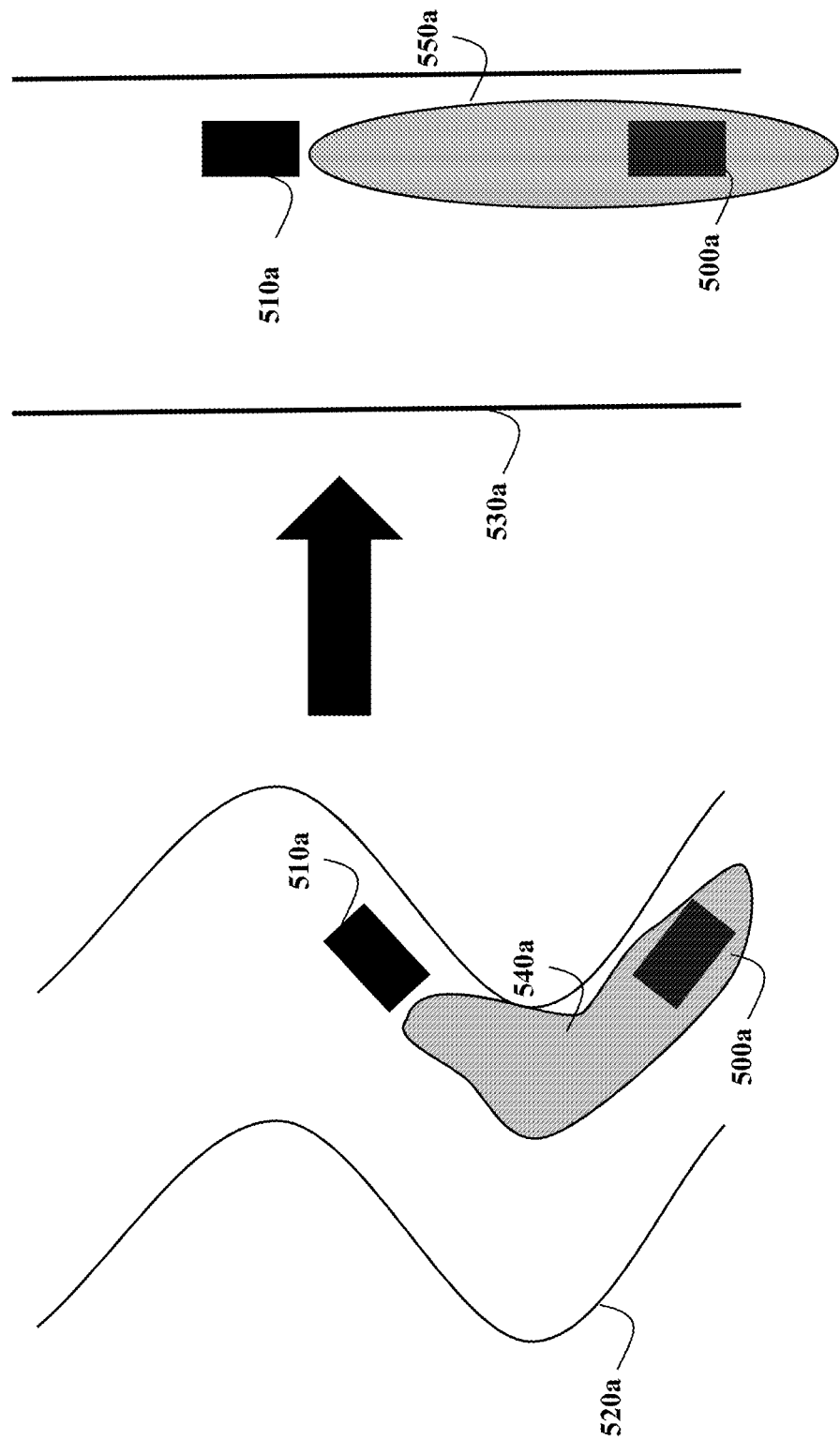

| Possible intentions of the driver |
|---|
| 810c  Turn left |
| 820c  Turn right |
| 830c  Drive straight |
| 840c  Change lane left |
| 850c  Change lane right |
| 860c  Brake |
| 870c  Accelerate |
| 880c  Maintain velocity |

FIG. 8C

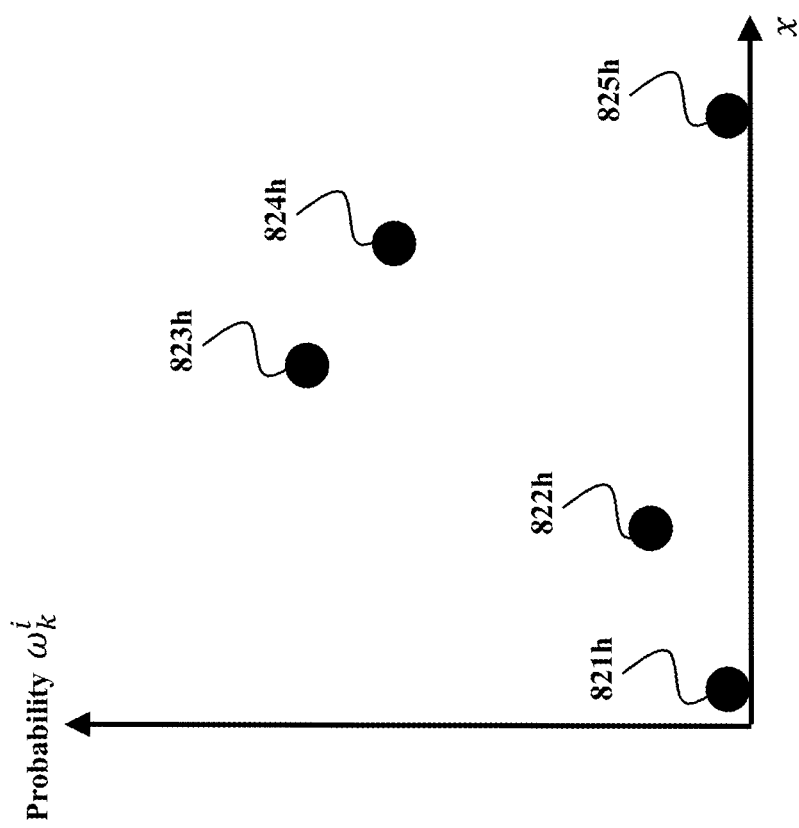

SYSTEM AND METHOD FOR CONTROLLING MOTION OF VEHICLE WITH VARIABLE SPEED

RELATED APPLICATIONS

This application is related to co-pending U.S. application Ser. No. 15/472,361 filed Mar. 29, 2017.

TECHNICAL FIELD

The invention relates generally to autonomous driving and advanced driver-assistance systems, and, more particularly, to controlling motion of vehicle with variable speed taking in consideration the risk posed by the motions of other vehicles.

BACKGROUND

Reliable localization and motion prediction is a key component for autonomous driving and advanced driver-assistance systems (ADAS). For example, one component in an autonomous vehicle and ADAS is the motion planner, which takes information about the surroundings and computes a trajectory profile to navigate towards a goal location, often in presence of moving obstacles. As another example, ADAS, such as lane-change systems, need accurate information about where other vehicles are located, both at the current time, but also for some future time.

To that end, modern vehicles sometimes include a threat assessment and/or collision avoidance systems that employ object detection sensors that are used to enable collision warning or avoidance and other active safety applications. The object detection sensors may use any of a number of technologies, such as short range radar, long range radar, cameras with image processing, laser or LiDAR, ultrasound, etc. The object detection sensors detect vehicles and other objects in the path of a host vehicle, and the application software uses the object detection information to provide warnings or take actions as appropriate. In many vehicles, the object detection sensors are integrated directly into the front bumper or other fascia of the vehicle.

However, threat assessment and/or collision avoidance when planning the lateral motion of the host vehicle are difficult tasks. For example, a system described in U.S. Pat. No. 8,543,261 considers the threat assessment by generating optimal vehicle states and generating a threat assessment based for those optimal states. However, computing optimal paths may be computationally prohibitive, especially in complex environments.

In U.S. 2016/0109571, the threat assessment is based on a predicted trajectory of the host vehicle using the motion dynamics of the vehicle and multiple returned scan points of detected vehicles and computing the risk of each detected vehicle intersecting the predicted path of the host vehicle. However, to predict the intersection of each possible trajectory of lateral motion of the host vehicle with each possible trajectory of other vehicles can be computationally prohibitive.

Accordingly, there is a need for a system and a method for controlling lateral motion of vehicle taking in consideration the risk posed by the motions of other vehicles in a computationally efficient manner.

SUMMARY

Some embodiments are based on understanding that the lateral motion of a vehicle can be controlled according to different trajectories. For example, a lane changing maneuver can be achieved by multiple trajectories having different values of the rate of change of the lateral displacement and different forward velocities, hereafter denoted as speed. To that end, it can be desired to precompute different trajectories for different objectives of the lateral motion and test the feasibility of those trajectories for the current traffic situations while controlling the motion of the vehicle in real time.

However, some embodiments are based on understanding that precomputing and testing those trajectories can still be a computationally challenging task. Specifically, for each objective of the lateral motion, such as a right to left lane change, a left to right lane change, a passing from the right or a passing from the left, can be a huge if not infinite number of possible trajectories that take the vehicle from the current position to the position corresponding to the current objective. In addition, if an obstacle intersects a trajectory at even only one point of the trajectory, the entire trajectory needs to be discarded thereby wasting the computational and memory resources.

Some embodiments are based on realization that the reason for the multitude of trajectories and sensitivity of all points of the trajectory to a partial collision lies in interdependency of all points of the trajectories in time. Specifically, the trajectories are the functions of time specifying not only the sequence of points but also the transitions between the points as the function of time. Those transitions govern the state and the dynamics of the vehicle at each point of the trajectory, forcing the vehicle to move according to the trajectory. The same lateral displacement between two neighboring points can be achieved with different time transitions and different speeds of the vehicle. In turn, different time transitions impose different states of the vehicle in those two neighboring points making each trajectory unique and interdependent.

Some embodiments are based on realization that by breaking time interdependency between values of the lateral displacement of the vehicle and the speed of the vehicle, the computation of the collision free trajectory for the lateral motion of the vehicle can be simplified. Some embodiments are based on realization that different values of the lateral displacement can be decoupled from each other by constructing a region for each lateral displacement and vehicle speed defining a control invariant set of the states of the lateral dynamic determined such that the vehicle having a state within a region is capable to maintain its states within the region.

Some embodiments are based on realization that when it is possible to maintain the state of the vehicle within a region, the collisions of the region with different obstacles at different points of time can be evaluated separately and independently from collision evaluation of other regions. After the evaluation is complete, it is possible to select a time sequence defining a collision free sequence of regions forming a union of regions in space and time according to a desired objective of the lateral motion. To say it more figuratively, the desired sequence of regions are chained on a collision free thread of time. By changing the collision free thread of time, different collision-free trajectories can be formed.

In some embodiments, a set of regions of states of lateral dynamic of the vehicle for a given vehicle speed are determined for a corresponding set of points defining lateral displacements on the road traveled by the vehicle. Each state of lateral dynamic includes a lateral displacement, a rate of change of the lateral displacement, a lateral orientation, and a rate of change of the lateral orientation of the vehicle. Each region defines a control invariant set of the states of the lateral dynamic determined such that the vehicle having a state within a region is capable to maintain its states within the region for vehicle velocities in a bounded range of velocities.

In some embodiments, the regions are intersecting with each other. In such a manner, the union of collision free regions in space and time can be formed without evaluating the transitions outside of the regions.

In some embodiments, the set of regions are predetermined for the lateral dynamic of the vehicle without consideration of the longitudinal dynamic of the vehicle, but where the vehicle speed is a parameter to the lateral dynamics. Such a decoupling allows to reuse the same set of regions for different longitudinal displacement of the vehicle to determine collisions of different regions at different times.

In alternative embodiments, the set of regions are predetermined for the lateral dynamic of the vehicle in consideration of the longitudinal dynamic of the vehicle. For example, in one embodiment, different set of regions are determined for different values of longitudinal velocity of the vehicle. This embodiment allows to select the set of regions corresponding to a current and/or desired longitudinal velocity of the vehicle. In one embodiment, the connections between sets of regions for different velocities are done in consideration of the longitudinal dynamics.

In various embodiments, the set of regions is stored in a memory of a control system. For example, in one embodiment, the set of regions is precomputed for all possible variations of the road conditions. In this embodiment, the variation of the shape of the road influencing lateral dynamic of the vehicle is handled by a motion controller.

In an alternative embodiment, the control system includes a transceiver to transmit a current location of the vehicle, and to receive, in response to the transmitting, the set of regions determined for the current shape of the road.

Accordingly, one embodiment discloses a control system of a vehicle for controlling motion of the vehicle traveling on a road shared with a set of moving objects. The control system includes a memory to store a set of equilibrium points defining lateral displacements on the road traveled by the vehicle and to store a set of regions of states of lateral dynamic of the vehicle corresponding to the set of equilibrium points, wherein each state of lateral dynamic includes a lateral displacement, a rate of change of the lateral displacement, a lateral orientation, and a rate of change of the lateral orientation, wherein each region defines a control invariant set of the states of the lateral dynamic determined for different speeds of the vehicle, such that the vehicle having a state within a region determined for a speed is capable to maintain its states within the region while moving with the speed, wherein each region includes a corresponding equilibrium point and intersects with at least one adjacent region, and wherein each equilibrium point is associated with one or multiple regions determined for different speeds; at least one sensor to generate a time-series signal indicative of a motion trajectory of each object in the set of moving objects on a road shared with the vehicle; a collision detector to detect a collision of each region determined for a first speed with at least one object at each time step of control in a time horizon when the motion trajectory of the object at the time step of control intersects a space defined by a longitudinal displacement of the vehicle at the time step of control and a range of values of the lateral displacement of the region to produce a data structure indicating collision-free regions at different time steps of control; a path planner to determine a time sequence defining a collision free sequence of regions forming a union of regions in space and time connecting a region including an initial displacement with a region including a target displacement to produce a trajectory within the union connecting the initial displacement with the target displacement; and a controller for controlling the vehicle according to the trajectory.

For example, the collision detector can detect a collision of each region determined for a second speed, when the path planner fails to determine the time sequence defining the collision free sequence of regions determined for the first speed. In this situation, the path planner determines the collision free sequence of regions determined for the second speed to control the vehicle.

For example, in some embodiments, the collision detector iterates through different values of the speed until a value of the speed for which the collision free sequence of regions determined for that value of the speed is found. For example, the collision detector can select the first speed as a current speed of the vehicle and start iteration from that current sped. Additionally, or alternatively, the collision detector can start iteration from the speed limit allowed on the traveled road.

In some implementations, a region determined for an equilibrium point representing a current displacement of the vehicle covers a sequence of speeds including the first speed and the second speed. For example, the speeds for determining regions are selected such that the regions corresponding to different speeds at similar lateral displacements overlap for at least one speed. In such a manner, the control system can safely change the speeds of the vehicle.

Another embodiment discloses a control method for controlling motion of the vehicle traveling on a road shared with a set of moving objects, wherein the method uses at least one processor coupled to a memory configured to store a set of equilibrium points defining lateral displacements on the road traveled by the vehicle and to store a set of regions of states of lateral dynamic of the vehicle corresponding to the set of equilibrium points, wherein each state of lateral dynamic includes a lateral displacement, a rate of change of the lateral displacement, a lateral orientation, and a rate of change of the lateral orientation, wherein each region defines a control invariant set of the states of the lateral dynamic determined for different speeds of the vehicle, such that the vehicle having a state within a region determined for a speed is capable to maintain its states within the region while moving with the speed, wherein each region includes a corresponding equilibrium point and intersects with at least one adjacent region, and wherein each equilibrium point is associated with one or multiple regions determined for different speeds, wherein the processor is coupled with stored instructions implementing the method, wherein the instructions, when executed by the processor carry steps of the method.

The method includes generating a time-series signal indicative of a motion trajectory of each object in the set of moving objects on a road shared with the vehicle; detecting a collision of each region determined for a first speed with at least one object at each time step of control in a time horizon when the motion trajectory of the object at the time step of control intersects a space defined by a longitudinal displacement of the vehicle at the time step of control and a range of values of the lateral displacement of the region to produce a data structure indicating collision-free regions at different time steps of control; determining a time sequence defining a collision free sequence of regions forming a union of regions in space and time connecting a region including an initial displacement with a region including a target displacement to produce a trajectory within the union connecting the initial displacement with the target displacement; and controlling the vehicle according to the trajectory.

BRIEF DESCRIPTION OF THE DRAWINGS

FIG. 1A shows an exemplar situation where a vehicle moves in the left lane of a two-lane road.

FIG. 5A shows an example of modeling the vehicle control in the frame of the vehicle according to some embodiments.

FIG. 8C shows a table listing various intentions of a hypothetical driver according to some embodiments.

FIG. 8H shows possible assigned probabilities of the five states at the first iteration in FIG. 8G.

DETAILED DESCRIPTION

Figure 1B:
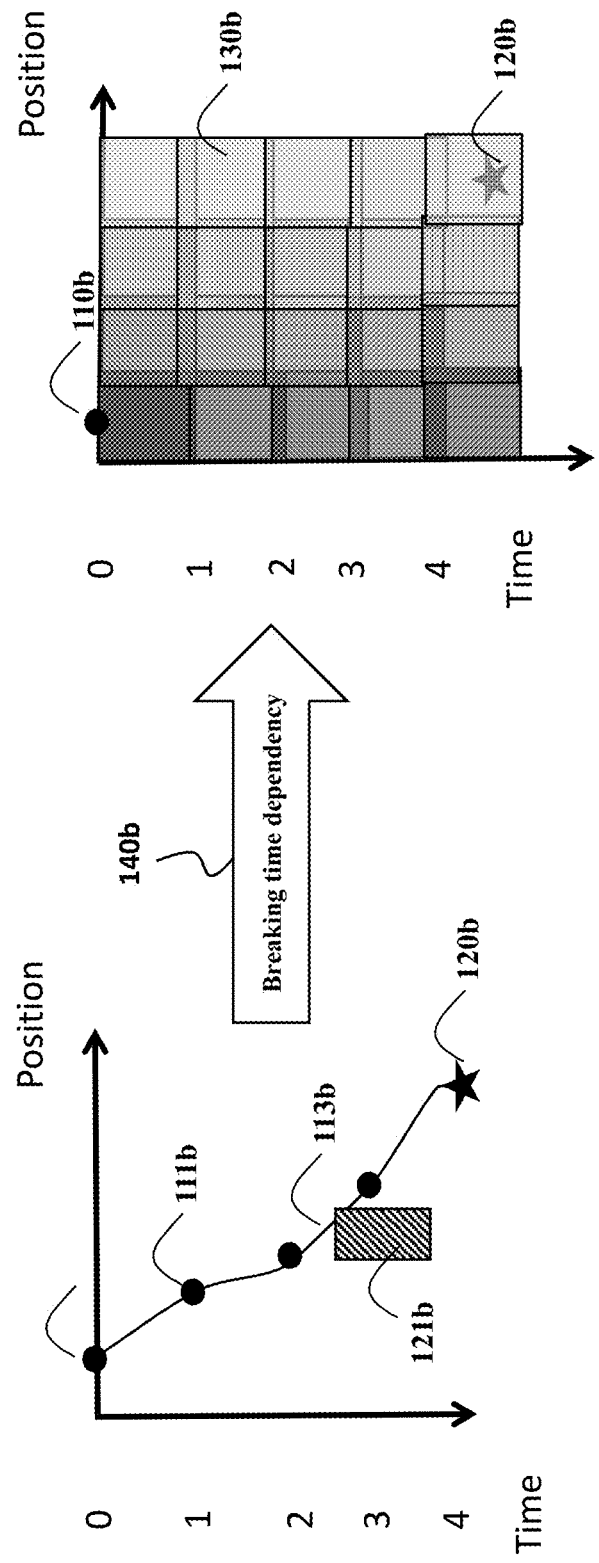
FIG. 1B shows a schematic illustrating principles employed by some embodiments for lateral motion of the vehicles.

Some embodiments of the invention are based on understanding that the lateral motion of a vehicle can be controlled according to different trajectories, wherein a vehicle in general is a road-bound vehicle, such as a passenger car, a bus, truck, or similar. For example, a lane-change maneuver can be achieved by multiple trajectories having different values of the rate of change of the lateral displacement. Depending on the particular traffic situation and the preference of the passengers of the vehicle, different trajectories may be more suitable than others. To that end, it can be desired to precompute different trajectories for different objectives of the lateral motion and test the feasibility of those trajectories for the current traffic situations while controlling the motion of the vehicle in real FIG. 1A shows an exemplar situation where a vehicle 101a moves in the left lane of a two-lane road with road boundaries 110a and lane divider 120a. The goal is to change lane to the right lane 130a. The motion corresponding to a lane change can be any of several motions 140a. Depending on if there are other vehicles in the surroundings, some of the trajectories 140*a* may not be suitable, or even impossible due to an imminent collision, to perform.

In general, the number of trajectories 140*a* may be large. Hence, to precompute and test the trajectories for feasibility can be a challenging and computationally demanding task. Specifically, for each objective of the lateral motion, such as a right to left lane change, a left to right lane change, a passing from the right or a passing from the left, can be a huge if not infinite number of possible trajectories. In addition, if an obstacle intersects a trajectory at even only one point of the trajectory, the entire trajectory needs to be discarded thereby wasting the computational and memory resources.

FIG. 1B shows a schematic illustrating principles employed by some embodiments for lateral motion of the vehicles. For instance, consider the left portion in FIG. 1B, illustrating a schematic of movement from the initial lateral position 110*b* to the target lateral position 120*b* in four time steps. To do this, the trajectory is composed of motions of the vehicle defined by state transitions 113*b* between points 111*b* to end up in 120*b* after four time steps. Here, a state trajectory includes a position and heading of the vehicle with time, i.e., velocity of the vehicle. If another vehicle 121*b* intersects with the computed trajectory 113*b*, the trajectory 113*b* is not valid anymore and a new trajectory either needs to be computed and again checked for collision with the obstacle 121*b* or taken from a library of precomputed trajectories.

A part of the reason for the multitude of trajectories and sensitivity of all points of the trajectory to a partial collision lies in interdependency of all points 111*b* of the trajectories in time. Specifically, the trajectories 113*b* are the functions of time specifying not only the sequence of points 111*b* but also the transitions between the points as the function of time. Those transitions govern the state and the dynamics of the vehicle at each point of the trajectory, forcing the vehicle to move according to the trajectory. The same lateral displacement between two neighboring points can be achieved with different time transitions. In turn, different time transitions impose different states of the vehicle in those two neighboring points making each trajectory unique and interdependent.

Some embodiments are based on realization that by breaking 140*b* time interdependency between values of the lateral displacement of the vehicle, the computation of the collision free trajectory for the lateral motion of the vehicle can be significantly simplified. Some embodiments are based on realization that different values of the lateral displacement can be decoupled from each other by constructing a region determined such that the vehicle having a state within a region is capable to, and will, maintain its states within the region.

For instance, the right portion of FIG. 1B shows the situation when the goal is to control the vehicle from the initial lateral displacement 110*b* to the target lateral displacement 120*b*. Instead of determining a trajectory 113*b* defining points 111*b* and corresponding state transitions between the points, one embodiment realizes that the target lateral displacement 120*b* can be reached from 110*b* by constructing regions where it is safe for the vehicle to be. The regions are overlapping, meaning that it is possible to move in a safe corridor of regions from initial point 110*b* to final lateral displacement 120*b* within the regions such that collision is avoided. Consequently, by using the regions instead of specific trajectories, safe trajectories residing in the safe corridor of the regions can be determined, which ensures that if an obstacle 121*b* intersects with a particular region 130*b* in a particular time window, the region is marked as unsafe and other safe regions can be used instead.

Figure 2:
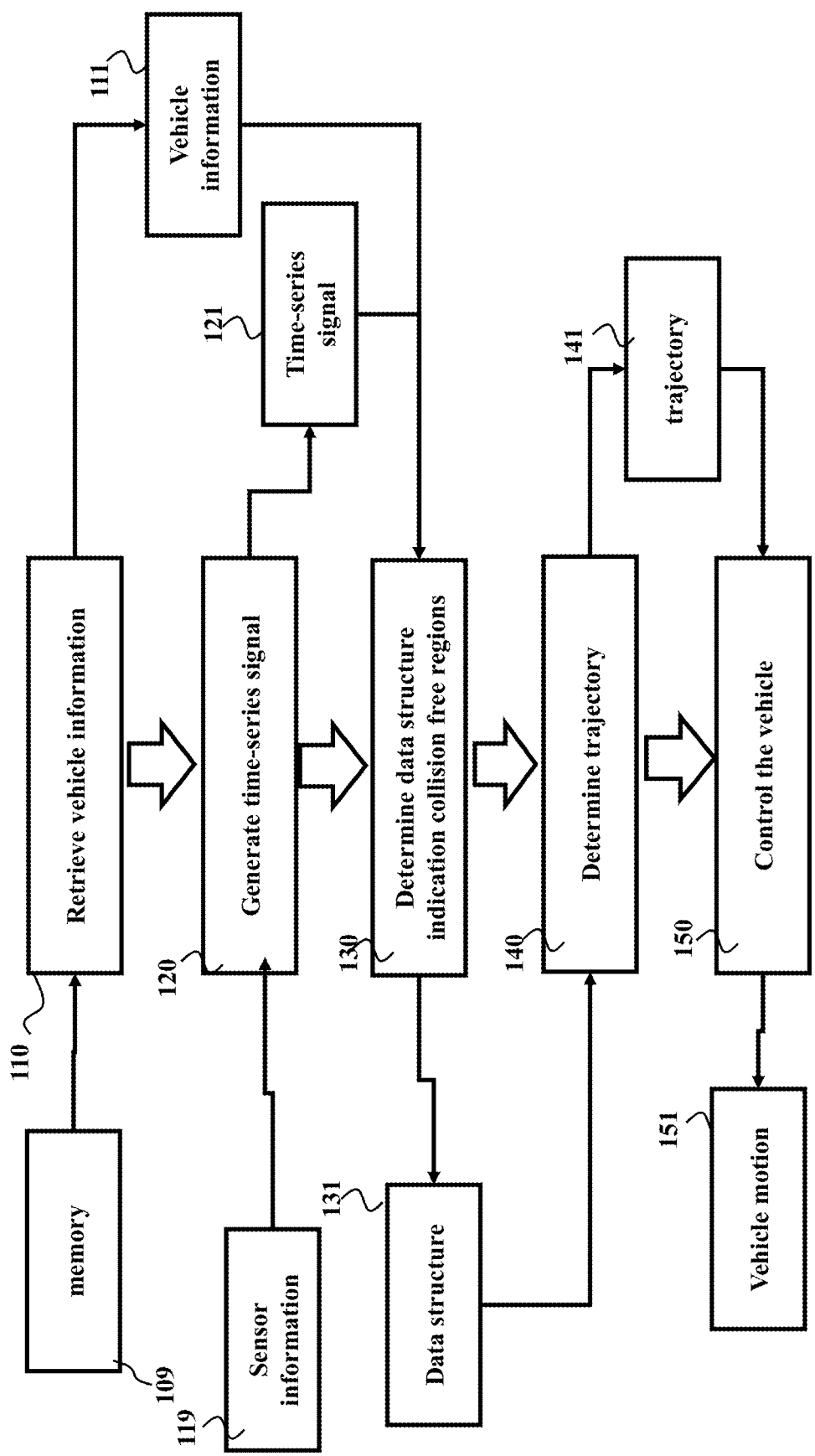
FIG. 2 shows a flowchart of a method for controlling a vehicle traveling on a road shared with a set of moving obstacles.

FIG. 2 shows a flowchart of a method for controlling a vehicle traveling on a road shared with a set of moving obstacles or objects, hereafter interchangeably denoted with vehicles. The method uses a memory to store information necessary for implementing steps of the method. The method retrieves 110 from memory 109 a set of equilibrium points defining lateral displacements and orientation of the vehicle on the road and a set of regions of states of the lateral dynamics of the vehicle corresponding to the equilibrium points, wherein each state of the lateral dynamics includes a lateral displacement, a rate of change of the lateral displacement, a lateral orientation, and a rate of change of the lateral orientation. Each region defines a control invariant set of the states of the lateral dynamic determined such that the vehicle having a state within a region is capable to maintain its states within the region. In some implementations, each region includes a corresponding equilibrium point and intersects with at least one adjacent region.

The method generates 120, using the information 119 from at least one sensor either directly connected to the vehicle or remotely connected to the vehicle, a time-series signal 121 indicative of motion of each object in the set of moving objects detected by the sensors. The measurements can include camera measurements or laser/LIDAR measurements. The measurements can include measurements from vehicle to vehicle communication, and the measurements can include GPS data. The length of the measurement sequence can vary from vehicle to vehicle.

Using the time-series signal 121 and the retrieved information 111 from memory, the method determines 130 a data structure indicating collision-free regions at different time steps of control. In the determining 130, a collision detector detects a collision of each region with at least one object at each time step of control in a time horizon when a trajectory of the object at the time step of control intersects a space defined by a longitudinal displacement of the vehicle at the time step of control and a range of values of the lateral displacement of the region. Then, using the determined data structure 131, the method determines 140, using a path planner, a time sequence defining a collision free sequence of regions forming a union of regions in space and time connecting a region including an initial displacement with a region including a target displacement to produce a trajectory 141 within the union connecting the initial displacement with the target displacement. Finally, the method controls 150 the vehicle to produce a vehicle motion 151 according to the trajectory 141.

Figure 3A:
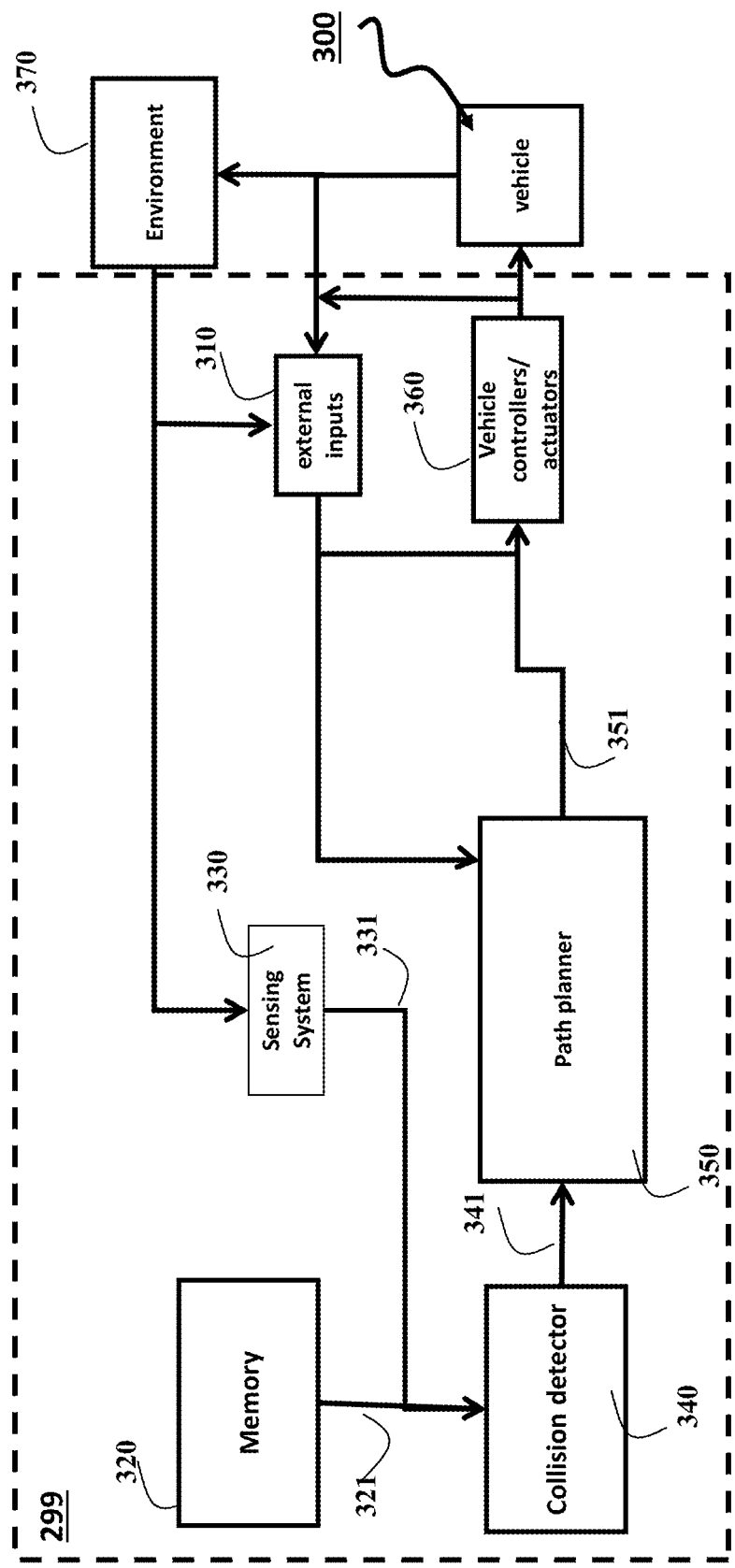
FIG. 3A shows a block diagram of a control system for controlling motion of a vehicle traveling on a road shared with a set of moving objects according to some embodiments.

FIG. 3A shows a block diagram of a control system 299 for controlling motion of a vehicle 300 traveling on a road shared with a set of moving objects according to some embodiments. The vehicle can also receive external inputs 310 overriding the commands of the control system 299. In such a case the vehicle is a semi-autonomous vehicle.

The control system 299 includes a memory 320 to store a set of equilibrium points defining lateral displacements on the road traveled by the vehicle and to store a set of regions of states of lateral dynamic of the vehicle corresponding to the set of equilibrium points, wherein each state of lateral dynamic includes a lateral displacement, a rate of change of the lateral displacement, a lateral orientation, and a rate of change of the lateral orientation, wherein each region defines a control invariant set of the states of the lateral dynamic determined such that the vehicle having a state within a region is capable to maintain its states within the region, wherein each region includes a corresponding equilibrium point and intersects with at least one adjacent region.

The control system includes a sensing system 330 including at least one sensor for generating a time-series signal 331 indicative of motion of each vehicle in the set of vehicles traveling in the environment 370. For example, the sensing system 330 can measure positions using a global positioning system (GPS) information and/or inertial motion using an inertial measurement unit (IMU). For example, the IMU can comprise 3-axis accelerometer(s), 3-axis gyroscope(s), and/or magnetometer(s). The IMU can provide acceleration, velocity, orientation, and/or other position related information to other components of the control system 299.

The control system 299 includes a collision detector 340 to detect a collision of each region stored in the memory 320 with at least one object at each time step of control in a time horizon when a trajectory of the object at the time step of control intersects a space defined by a longitudinal displacement of the vehicle at the time step of control and a range of values of the lateral displacement of the. The collision detector outputs 341 a data structure indicating collision-free regions at different time steps of control. The data structure 341 is used by a path planner 350 embedded in the control system 299, which determines a time sequence defining a collision free sequence of regions forming a union of regions in space and time connecting a region including an initial displacement with a region including a target displacement to produce a trajectory within the union connecting the initial displacement with the target displacement. The determined trajectory 351 is used by at least one controller 360 of the vehicle to control the vehicle according to the trajectory.

Figure 3B:
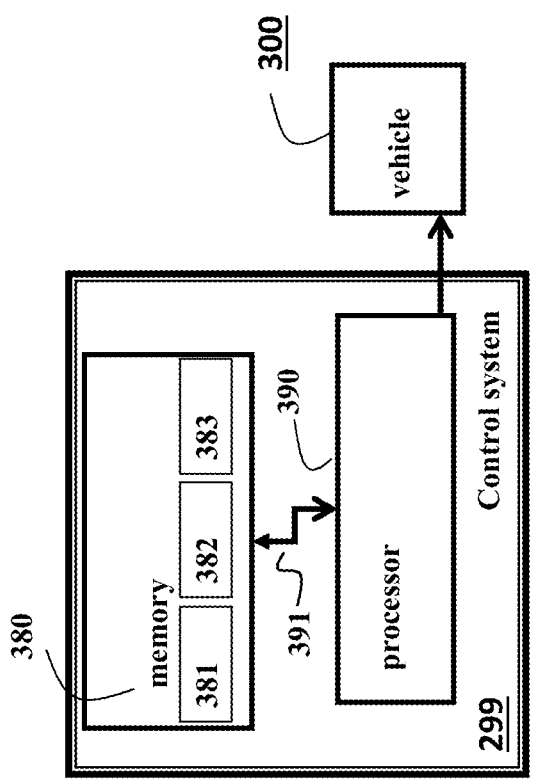
FIG. 3B shows a general structure of the control system according to one embodiment.

FIG. 3B shows a general structure of the control system 299 according to one embodiment. The control system 299 includes at least one processor 390 for executing modules of the collision detection and path planning. The processor 390 is connected 391 to a memory 380 that stores a set of equilibrium points 381 defining lateral displacements and lateral orientation on the road traveled by the vehicle and a set of regions 382 of states of lateral dynamic of the vehicle corresponding to the set of equilibrium points, wherein each state of lateral dynamic includes a lateral displacement, a rate of change of the lateral displacement, a lateral orientation, and a rate of change of the lateral orientation, wherein each region defines a control invariant set of the states of the lateral dynamic determined such that the vehicle having a state within a region is capable to maintain its states within the region, wherein each region includes a corresponding equilibrium point and intersects with at least one adjacent region.

Figure 4A:
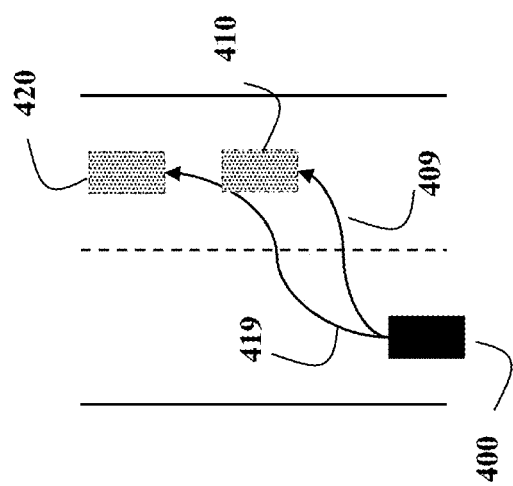
FIG. 4A shows a schematic of a motion objective of a vehicle.

FIG. 4A shows a schematic of a motion objective of a vehicle, where the vehicle 400 initiates a lane change from the left lane to the right lane, where the goal is to end up in the middle of the right lane. The initiating the lane change can be done either by the control system or by external inputs to the control system. For instance, a driver of the vehicle can initiate the lane change from the dashboard of the vehicle. Some embodiments are based on the realization that there are several trajectories that can lead to a final target lateral displacement of the vehicle. The state transitions defining the trajectory 419 leads to the vehicle 400 reaching the middle of the right lane at position 420, whereas the trajectory 409 leads to reaching the middle of the right lane at position 409. Determining that 419 and 409 are collision free may be computationally prohibitive in an environment with a number of obstacles and with a multitude of trajectories 409 and 419. For instance, any position between 410 and 420 leads to a different trajectory, thus ultimately leading to an infinite number of possible trajectories leading up to the desired lateral displacement. However, the exact trajectory leading up to the desired lateral displacement of the vehicle is of lower importance than that the vehicle actually ends up at the desired lateral displacement.

Figure 4B:
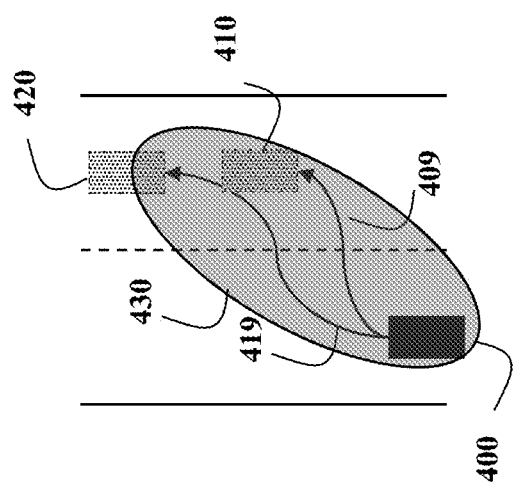
FIG. 4B shows benefits of a control invariant region according to some embodiments.

FIG. 4B shows benefits of a control invariant region according to some embodiments. A region 430 has been determined such that a vehicle having a state within a region is capable to maintain its states within the region. By considering regions instead of individual trajectories, it is enough to determine if an object intersects with the region 430 to exclude all trajectories 409 and 419 in that region, without determining the trajectories 409 and 419.

Accordingly, one embodiment determines regions associated with a lateral displacement of the vehicle, where each region covers a multitude of state transitions and corresponding trajectories the vehicle could undertake, and where the lateral displacement defines an equilibrium point of the vehicle. For instance, one embodiment determines the region as a control invariant set of the states of the lateral dynamics of the vehicle associated with a lateral displacement. A control invariant set is a region associated with an equilibrium, i.e., stationary point of the lateral dynamics of the vehicle, and a controller for controlling the lateral motion of the vehicle. The size of the region depends on the parameters of the lateral dynamics of the vehicle and the controller used for controlling the lateral dynamics of the vehicle. When using a controller to control the lateral motion of the vehicle, a control invariant set can be associated with the controller and the equilibrium point, i.e., lateral displacement, of the vehicle on the road.

Figure 4C:
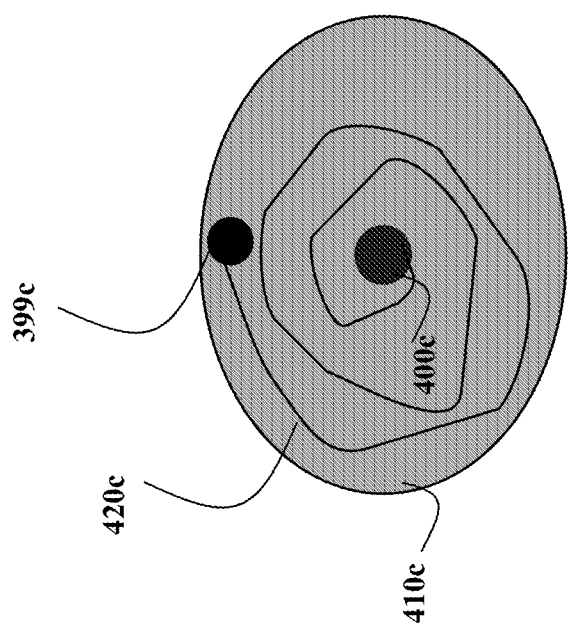
FIG. 4C shows a schematic of exemplar control invariant region used by some embodiments.

FIG. 4C shows a schematic of exemplar control invariant region used by some embodiments. The initial state 399c of the vehicle is inside the control invariant set 410c. The goal, i.e., the objective of the motion or the lateral maneuver, is to use the controller to control the vehicle to the position 400c. Hence, because the initial state 399c is inside the region 410c defined by the control invariant set, the trajectory 420c resulting from controlling the vehicle to the target displacement 400c is guaranteed to be inside the region as long as the desired displacement is unchanged.

In some embodiments, lateral displacements are determined such that the corresponding regions intersect. Doing in such a manner, a corridor of regions are constructed such that when the regions do not intersect with an object, they provide a safe sequence of lateral displacements and associated trajectory to move the vehicle from initial lateral displacement to target lateral displacement.

Figure 4D:
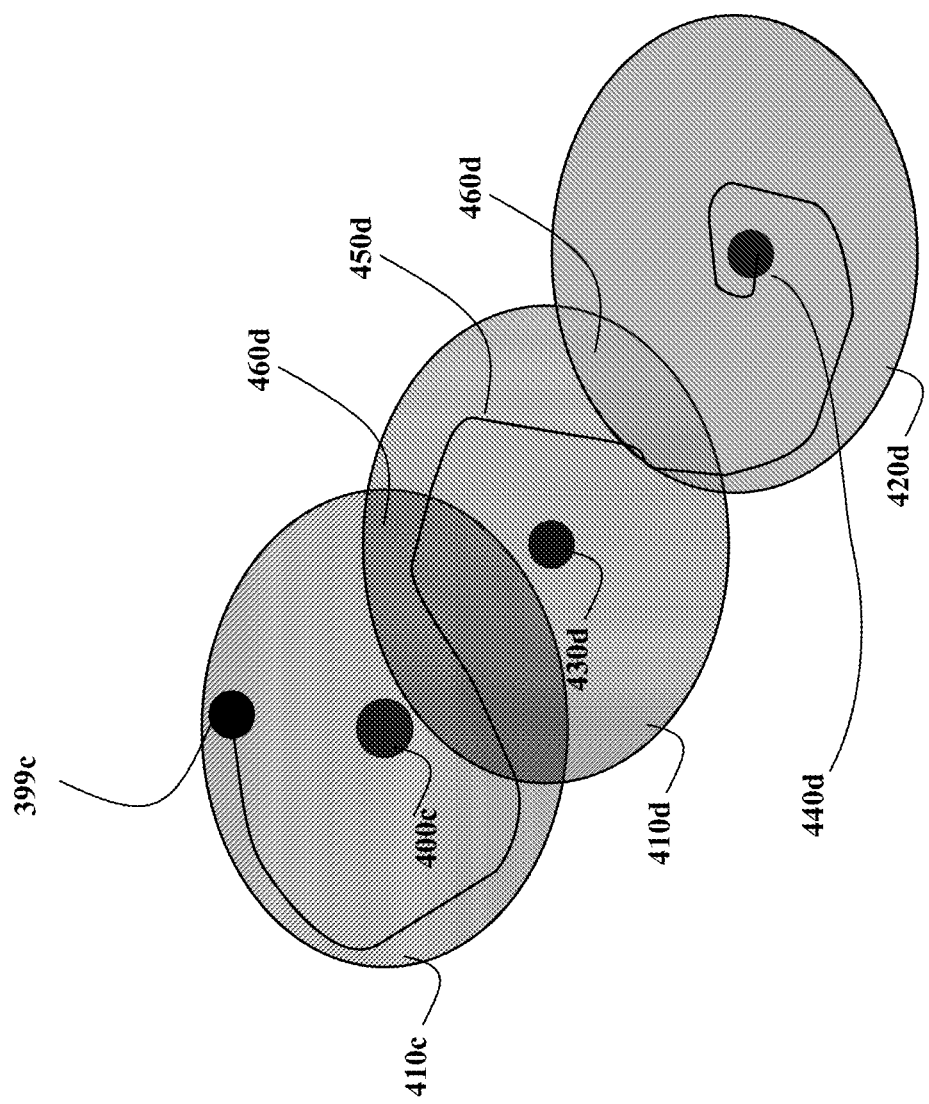
FIG. 4D illustrates a scenario of the motion through a set of control invariant regions to a target position according to some embodiments.

FIG. 4D illustrates a scenario of the motion through a set of control invariant regions to a target position 440d according to some embodiments. The region 420d associated with 440d does not intersect with the region 410c that covers the initial position 399c. To this end, one embodiment determines another lateral displacement, illustrated by the location 430d, which has the associated region 410d that intersects with the region 410c and the region 420d. Hence, when the trajectory 450d is inside the part 460d of the region that is shared with at least two regions, the intermediate target location 400c can be changed first to 430d, and then to the final target location 440d to produce a trajectory encapsulated in the safe corridor of the union of the regions.

FIG. 5A shows an example of modeling the vehicle control in the frame of the vehicle according to some embodiments. Referring to FIG. 5A, in one embodiment, it is realized that by modeling the controlling of the vehicle 500a in the frame of the vehicle instead of in the global frame, expressions simplify considerably. However, because of the modeling in the local frame of the vehicle, an equilibrium point may also have a lateral orientation in addition to a lateral displacement, to account for the inertial effects when going from global to local frame. In this example, the motion objective is to move the vehicle from the lateral displacement 500a to final lateral displacement 510a. For instance, modeling of the road in the global frame 520a leads to control invariant sets leading to regions 540a with complicated shapes that are difficult to express mathematically. Instead, numerical, approximate, approaches need to be used. However, by doing the modeling in the local frame 530 of the vehicle, the control invariant sets have simple forms, such as ellipsoids 550a, which can be expressed exactly and therefore more accurately.

As used by various embodiments, the control invariant sets are regions in the forward and lateral dimension of the vehicle. However, in general the sets are higher dimensional, and incorporate the state of the vehicle around the equilibrium point, where each state of the lateral dynamics includes a lateral displacement, a rate of change of the lateral displacement, a lateral orientation, and a rate of change of the lateral orientation, wherein each region defines a control invariant set of the states of the lateral dynamic determined such that the vehicle having a state within a region is capable to maintain its states within the region. The model of the vehicle can take several forms. In one embodiment, the vehicle model is a kinematic model, in which forces are ignored. Such models are suitable under limited driving conditions. In another embodiment, a vehicle model is expressed as a dynamical system from Newton's force-mass balance.

Figure 5B:
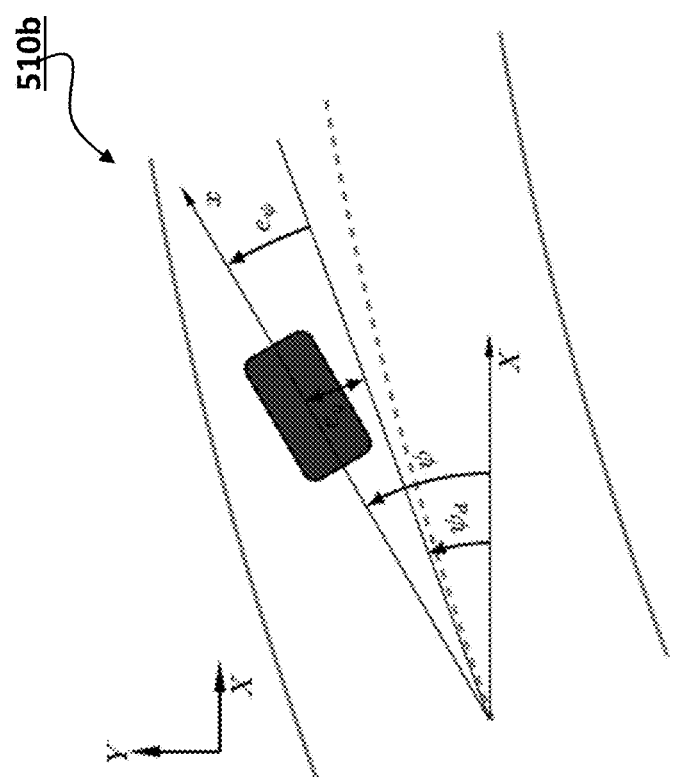
FIG. 5B shows a schematic of a model of a state of a vehicle used by some embodiments.

FIG. 5B shows a schematic of a model of a state of a vehicle used by some embodiments. For instance, the state is modeled with, where $e_y$ and $e_\psi = \psi - \psi_d$ denote the lateral position and vehicle orientation, respectively, in the road-aligned coordinate frame, and $\psi_d$ is the angle of the tangent of the road with respect to the inertial frame 510b. The vehicle model can be written as a linear dynamical system, where the term $D_e \psi_d$ is a disturbance acting on the vehicle model coining from the change of coordinate system from global to local frame. In one embodiment, this disturbance is cancelled out by the controller used to construct the control invariant sets.

Figure 5C:
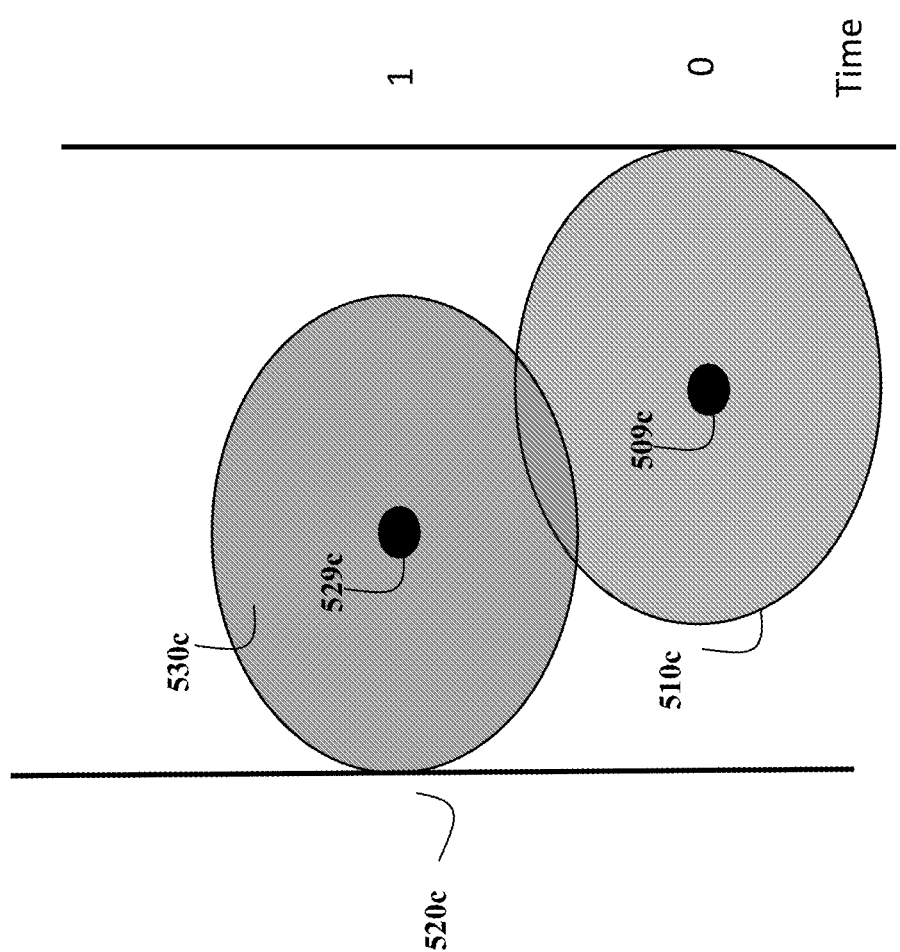
FIGS. 5C and 5D show examples of effects of the physical constraints of the system on the control invariant sets.
Figure 5D:
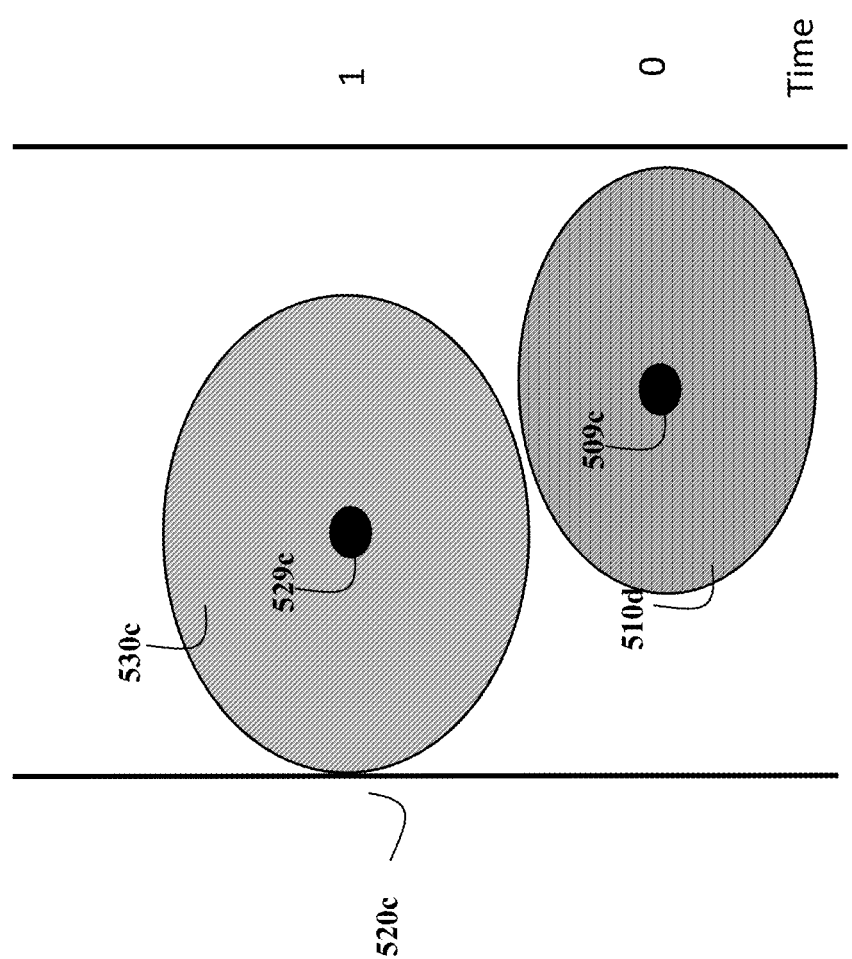

FIGS. 5C and 5D show examples of effects of the physical constraints of the system on the control invariant sets. Specifically, the control invariant sets can change shape and form depending on the physical constraints of the system. For instance, FIG. 5C to the left shows a control invariant set 510c at time 0 where the size of the region is limited to not intersect with obstacles 520c.

$$x = [e_y, \dot{e}_y, e_\psi, \dot{e}_\psi]^T \dot{x} = A_e x + B_e \delta + D_e \psi_d$$

Moreover, the region at time 0 intersects with the region 530c at time 1, meaning that it is possible to move from 509c to 529c in one-time step. However, if also limitations on the steering of the vehicle is set, the control invariant set may be smaller, because it is not possible to guarantee anymore to stay in a large region due to limited actuation. Thus, as shown in FIG. 5D, the control invariant set 510c is shrunk to 510d and does not intersect anymore with 530c. Hence, it is not possible to find a collision-free trajectory from 509c to 529c.

In some embodiments, the set of regions are predetermined for the lateral dynamics of the vehicle without consideration of the longitudinal dynamics of the vehicle. Such a decoupling allows to reuse the same set of regions for different longitudinal displacement of the vehicle to determine collisions of different regions at different times. In alternative embodiments, the set of regions are predetermined for the lateral dynamic of the vehicle in consideration of the longitudinal dynamic of the vehicle. For example, in one embodiment, different set of regions are determined for different values of longitudinal velocity of the vehicle. This embodiment allows to select the set of regions corresponding to a current and/or desired longitudinal velocity of the vehicle.

Figure 5E:
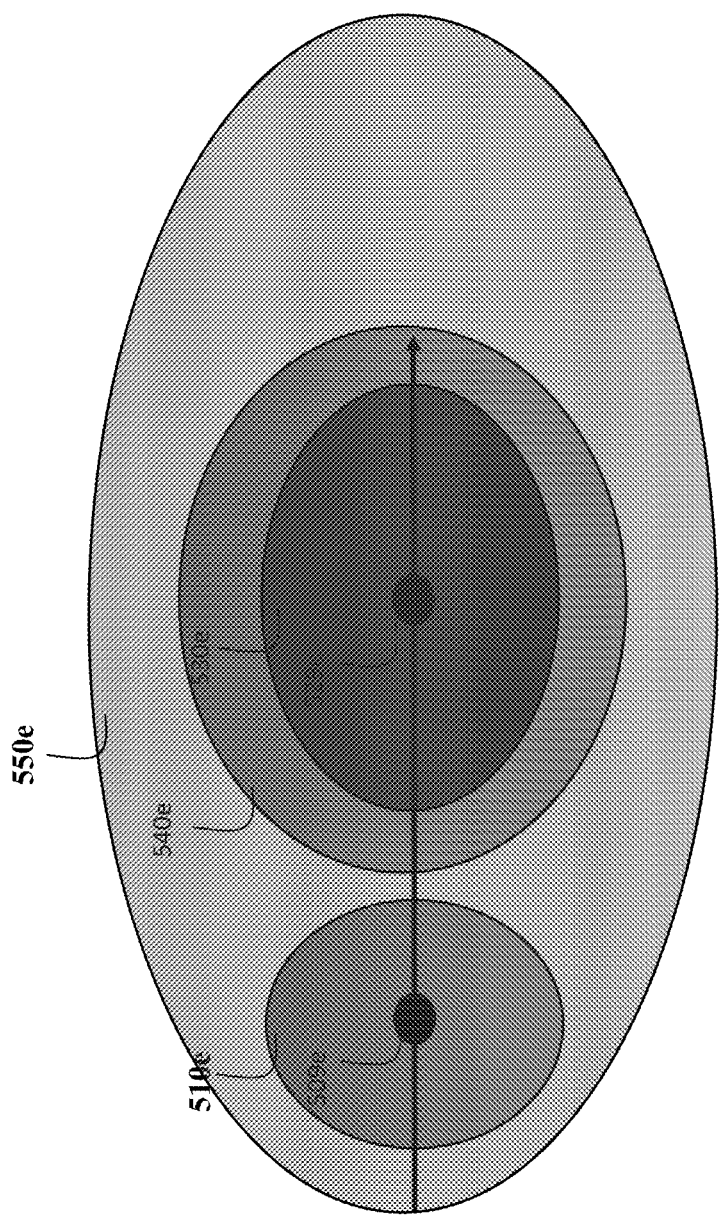
FIG. 5E shows an alternative exemplar of determining connections between equilibrium points.

FIG. 5E shows an alternative exemplar of determining connections between equilibrium points. Generally, as time increases the state is not only maintained in the control invariant set but also converges to the equilibrium point, implying that the effective control invariant set changes size as time changes. Thus, in one embodiment, the determining of the safe corridor is done based on shrinking the size of the safe region as time increases. For instance, in FIG. 5E the goal is to move from 509e to 529e, where the respective invariant sets are denoted with 510e and 530e. In one-time step of control, the invariant set 530e changes size to 540e, meaning that all states contained in 540e can reach the invariant set 530 e in one-time step of control. However, the set 540e does not contain the set 510e so it is not certain that all states in 510e can reach 530e. However, in yet another time step of control, the set 530e has increased size to 550e, which covers 510e. Thus, in two time steps of control, it is possible to reach from any state in 510e the invariant set 530e associated with the equilibrium point 529e, thus implying that is possible to move from 509e to 529e in two time steps of control.

Figure 6A:
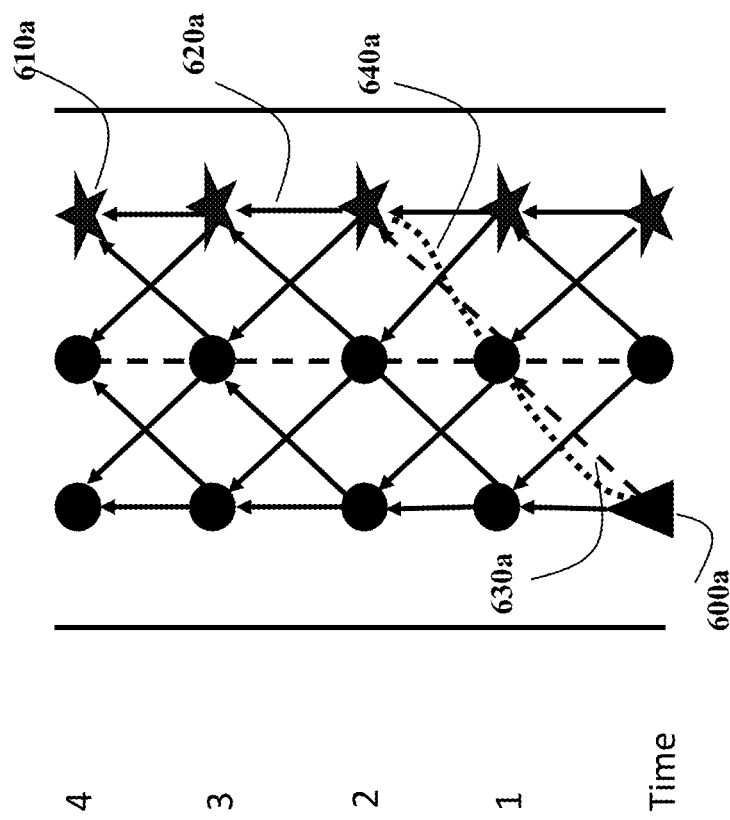
FIG. 6A shows an example a state transition graph defining possible transitions between equilibrium points corresponding to different regions for different time steps of control without considering obstacles according to some embodiments.

FIG. 6A shows an example a state transition graph defining possible transitions between equilibrium points corresponding to different regions for different time steps of control without considering obstacles according to some embodiments. In the example of FIG. 6A, the vehicle is in the region corresponding to the lateral displacement 600a and the motion objective is to move to the lateral displacement 610a. For instance, there are three lateral displacements, equilibrium points, on the road for each time step of control. The possible transitions 620 forming possible time sequences to reach the desired lateral displacement form a state-transition graph, which is stored in memory. From FIG. 6A, it can be evaluated the possible transition to reach the lateral displacement 610a, and the state time sequence corresponding to 630a is the sequence of equilibrium points that reach the lateral displacement in minimum time 2 time steps of control, leading up to producing the trajectory 640a.

Figure 6B:
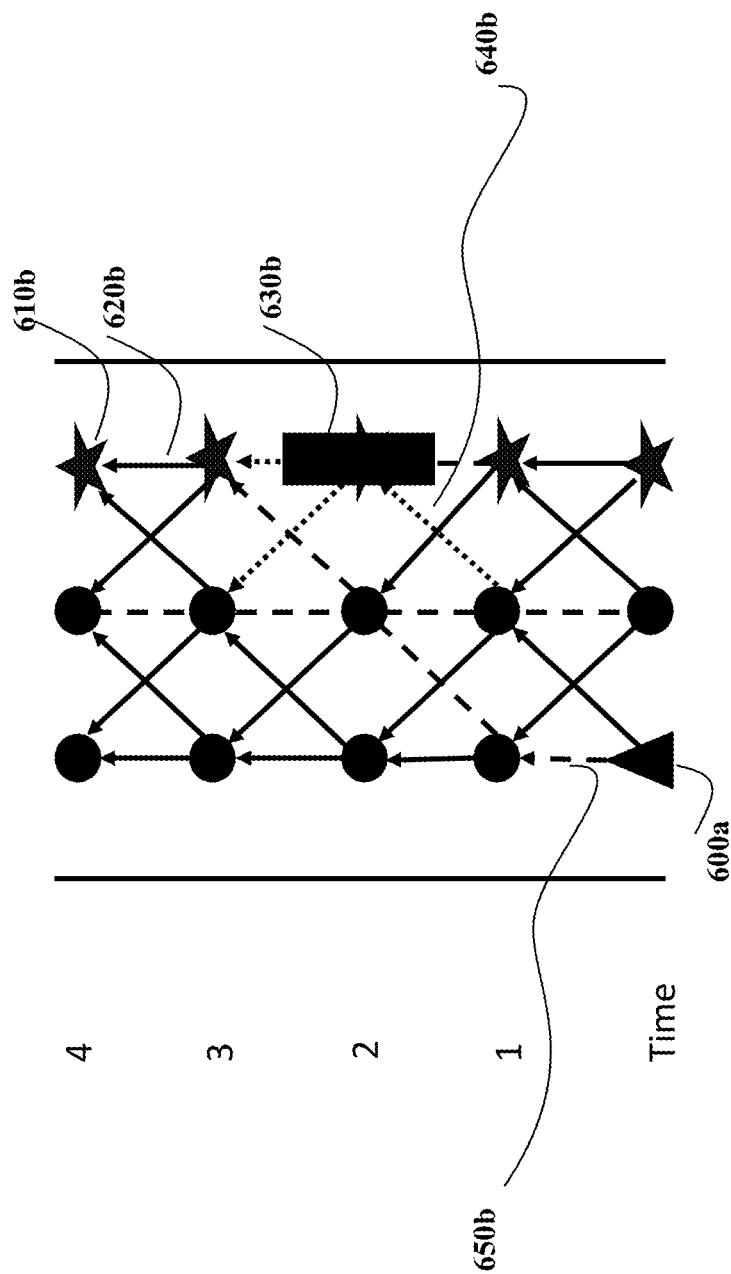
FIG. 6B shows the graph of FIG. 6A updated in response to detecting the obstacles to form a data structure indicating the collision-free regions according to some embodiments.

FIG. 6B shows the graph of FIG. 6A updated in response to detecting the obstacles to form a data structure indicating the collision-free regions according to some embodiments. For example, FIG. 6B shows the situation where there the collision detector detects an obstacle 630b, which invalidates the transitions 640b.

In some embodiments, the state transition graph is predetermined assuming no obstacles, wherein the collision detector invalidates at least some transitions on the graph in response to detecting the obstacles, and wherein the path planner searches through the valid transitions of the graph to find the union of regions. For instance, the path planner searches for the minimum time sequence 650b, which is now in 3 time steps of control. Additionally, or alternatively, in some embodiments, the transitions include uncertainties, such that the state transition graph is a Markov chain.

In one embodiment, the set of regions is precomputed for all possible variations of the road conditions and stored in memory of the control system. In this embodiment, the variation of the shape of the road influencing lateral dynamic of the vehicle is handled by a motion controller, for example, the motion control associated with the control invariant sets.

Figure 6C:
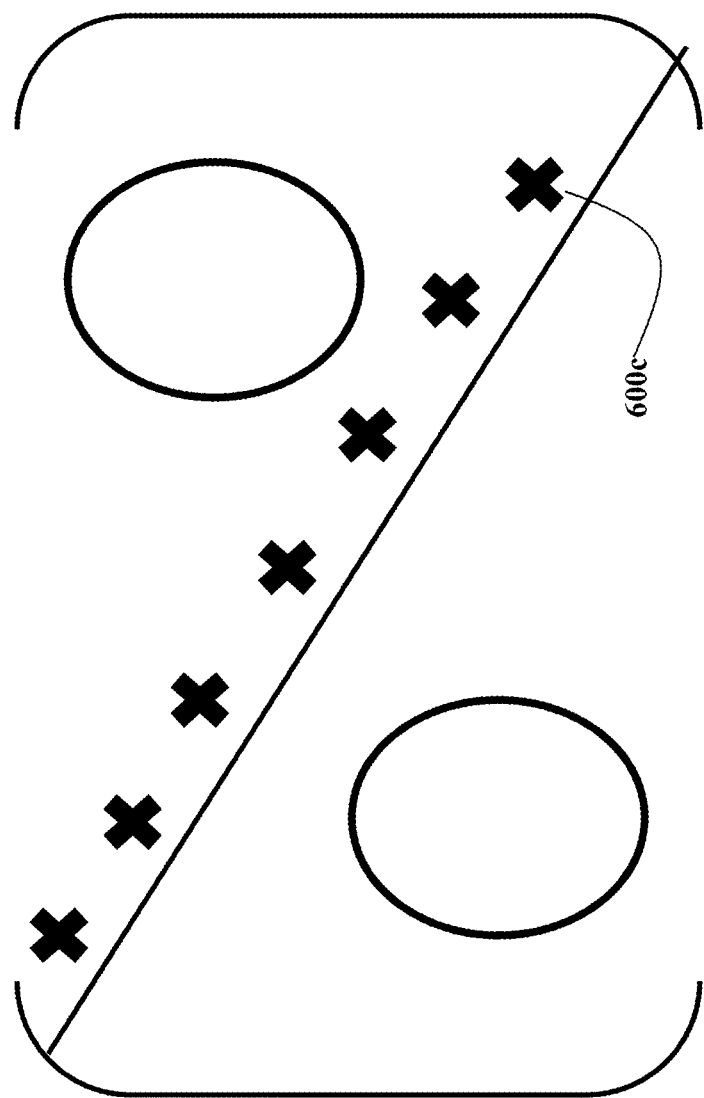
FIG. 6C shows a schematic of a data structure indicative of the state transition graph used by some embodiments.

FIG. 6C shows a schematic of a data structure indicative of the state transition graph used by some embodiments. For example, one embodiment stores the set of equilibrium points over the time steps of control indicative of the state transition graph as an upper block-diagonal matrix, wherein all elements leading to possible transitions are nonzero. And wherein all elements leading to impossible transitions are zero. For instance, if the number of time steps of control are N and the number of equilibrium points are M, then the matrix will be of size MN×MN, with the structure as in FIG. 6C, where the value of the nonzero elements are determined by the cost of moving from one equilibrium point to another equilibrium point, as explained by other embodiments of the invention. Each element 600c contains M elements and there are in total N elements 600c. All elements below the diagonal are zero because an equilibrium point cannot be reached with less than one-time step, i.e., the system has time causality. The elements up to the right of the matrix are zero because the invariant sets have limited size.

The collision detector 340 estimates the future motion based on the time-series signal indicative of the motion of the object. In one embodiment, the collision detector determines if the future motion of the object will intersect with each region associated with a lateral displacement.

Figure 7A:
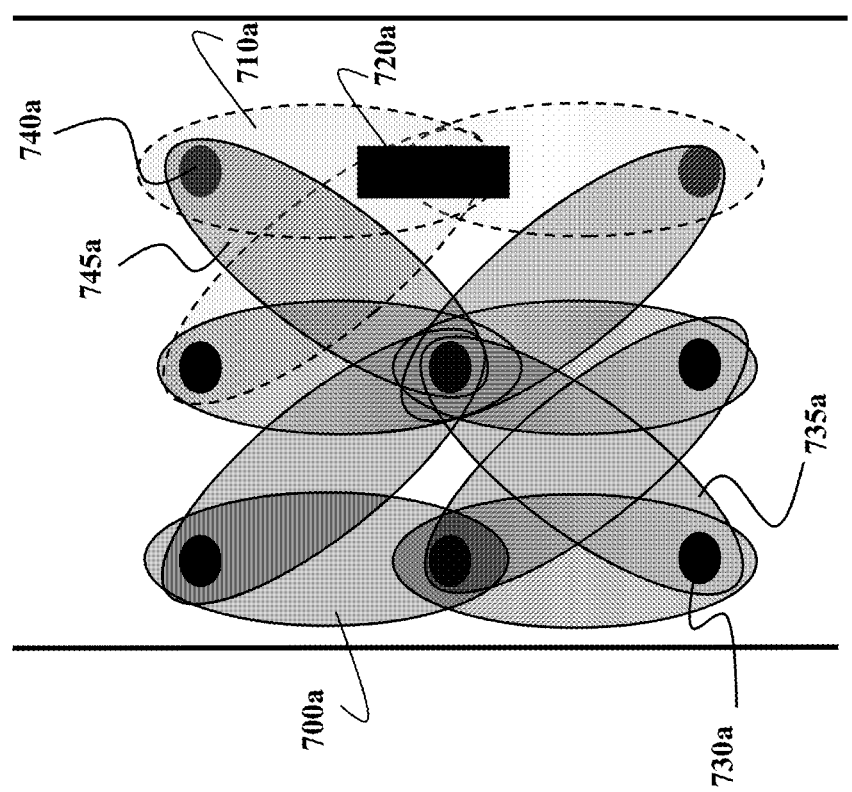
FIG. 7A shows a situation where parts of the safe regions 700a intersect with the predicted obstacle.

FIG. 7A shows a situation where parts 710a of the safe regions 700a intersect with the predicted obstacle 720a, and hence the collision detector invalidates the transitions on the graph corresponding to the regions 710a. In such a manner, the path planner determines a time sequence defining a collision free sequence of regions forming a union of regions in space and time connecting a region including an initial displacement with a region including a target displacement to produce a trajectory within the union connecting the initial displacement with the target displacement. For example, the union of regions 735a and 745a connects the state or the equilibrium points 730a and 740a in space and time to provide a collision free corridor. Any trajectory within that corridor is collision free.

For example, in one embodiment, the path planner determines the trajectory by optimizing a cost function of the motion of the vehicle within the union. Additionally, or alternatively, in one embodiment, the path planner determines the shortest time sequence forming the union. For example, the path planner can determine the trajectory connecting the equilibrium points defining the initial displacement and the target displacement.

In some embodiments, the predicted trajectory of the obstacles at least includes a path, velocity, and orientation/heading, but can also include further entities, such as rotational velocities, accelerations, and steering. In addition, the motion can be represented as a probability density function (PDF) that measures the probability that the motion is at a certain place in a certain time.

In some embodiments, the collision detector estimates a future trajectory of the object consistent with the time-series signal indicative of the motion of the object, estimates a probability of intersection of the future trajectory with each region at each time step of control and detect the region at the time step of control as collision free if the probability of intersection is below a threshold.

Figure 7B:
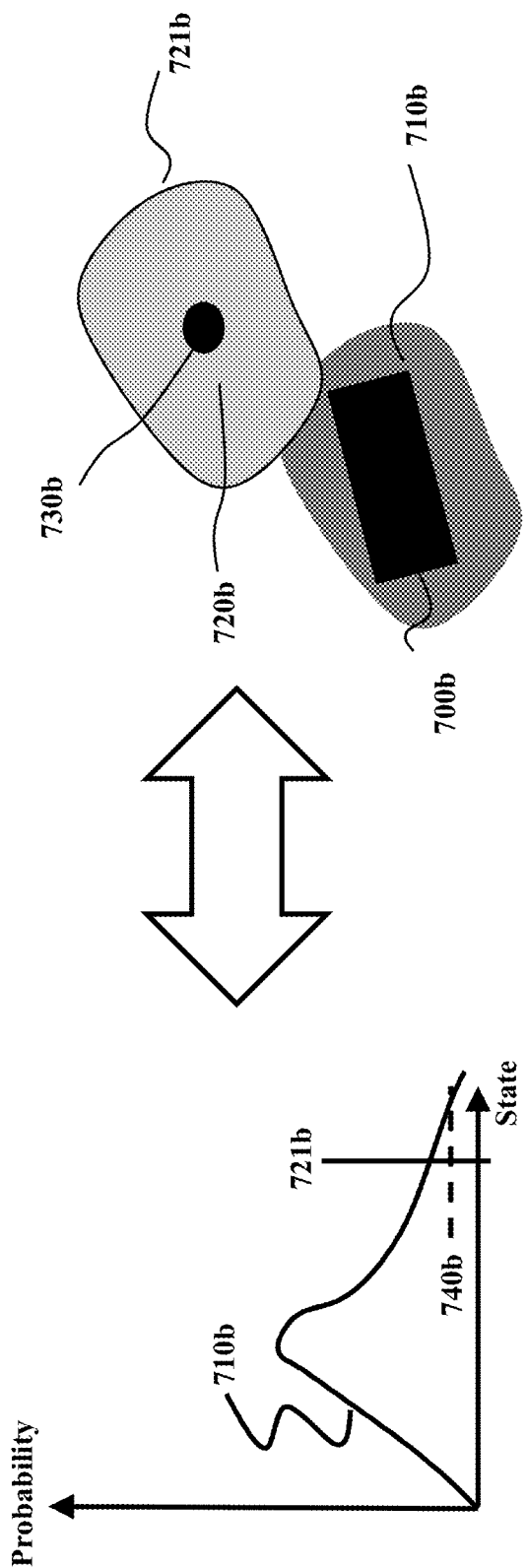
FIG. 7B illustrate schematic of determining the collision free regions probabilistically according to one embodiment.

FIG. 7B illustrate schematic of determining the collision free regions probabilistically according to one embodiment. For instance, in FIG. 7B the estimated location of an obstacle 700b at one-time step of control and associated PDF 710b of the location intersects with the region 720b corresponding to the equilibrium point 730b at one-time step of control. If the probability of intersecting with the border 721b of the safe region is above the threshold 740b, the transitions leading up to the equilibrium point 730b are invalidated and removed from the graph search of the path planner by setting the corresponding elements of the corresponding upper block-diagonal matrix.

Some embodiments are based on recognition that vehicles traveling in the environment shared with the host vehicle pose a threat to the host vehicle only when the vehicles are moving along the trajectories intersecting the trajectory of the host vehicle. This statement, however, can be reversed leading to the understanding that a hypothetical trajectory that intersects with the trajectory of the host vehicle poses a threat to the host vehicle only if there is another vehicle that travels along that hypothetical trajectory.

Some embodiments are based on realization that it is possible and computationally more efficient to evaluate the danger of the trajectories to the host vehicle rather than to evaluate the danger of the motion of other vehicles to the host vehicle. This is because there is limited number of feasible trajectories imposed by the drivable area, road traffic and/or map of the environment. These feasible trajectories can be pre-computed in a computationally efficient manner and it is easier to test whether the vehicle follows the pre-computed trajectory rather than to generate all possible trajectories for the moving vehicle. In such a manner, the problem of generating the optimal trajectories is replaced with the assigning and/or classification problem, which is computationally more efficient.

Some embodiments are based on realization that the intersection of a feasible trajectory with the trajectory of the host vehicle can be determined probabilistically. In such a manner, the feasible trajectory can be represented by a probability density function to cover a wider space of a drivable area, thereby reducing a number of feasible trajectories to generate. Similarly, the assignment of the vehicle to a feasible trajectory can also be determined probabilistically to represent the uncertainty of the measurements of the motion, possibility of rapid change of the driving intention of a driver of the vehicle, and possibility of motion along segments that belong to multiple trajectories.

To that end, some embodiments determine a level of risk of a feasible trajectory as a combination of a probability of the feasible trajectory to intersect with the trajectory of the host vehicle and a probability of the feasible trajectory to be followed by at least one vehicle.

Figure 8A:
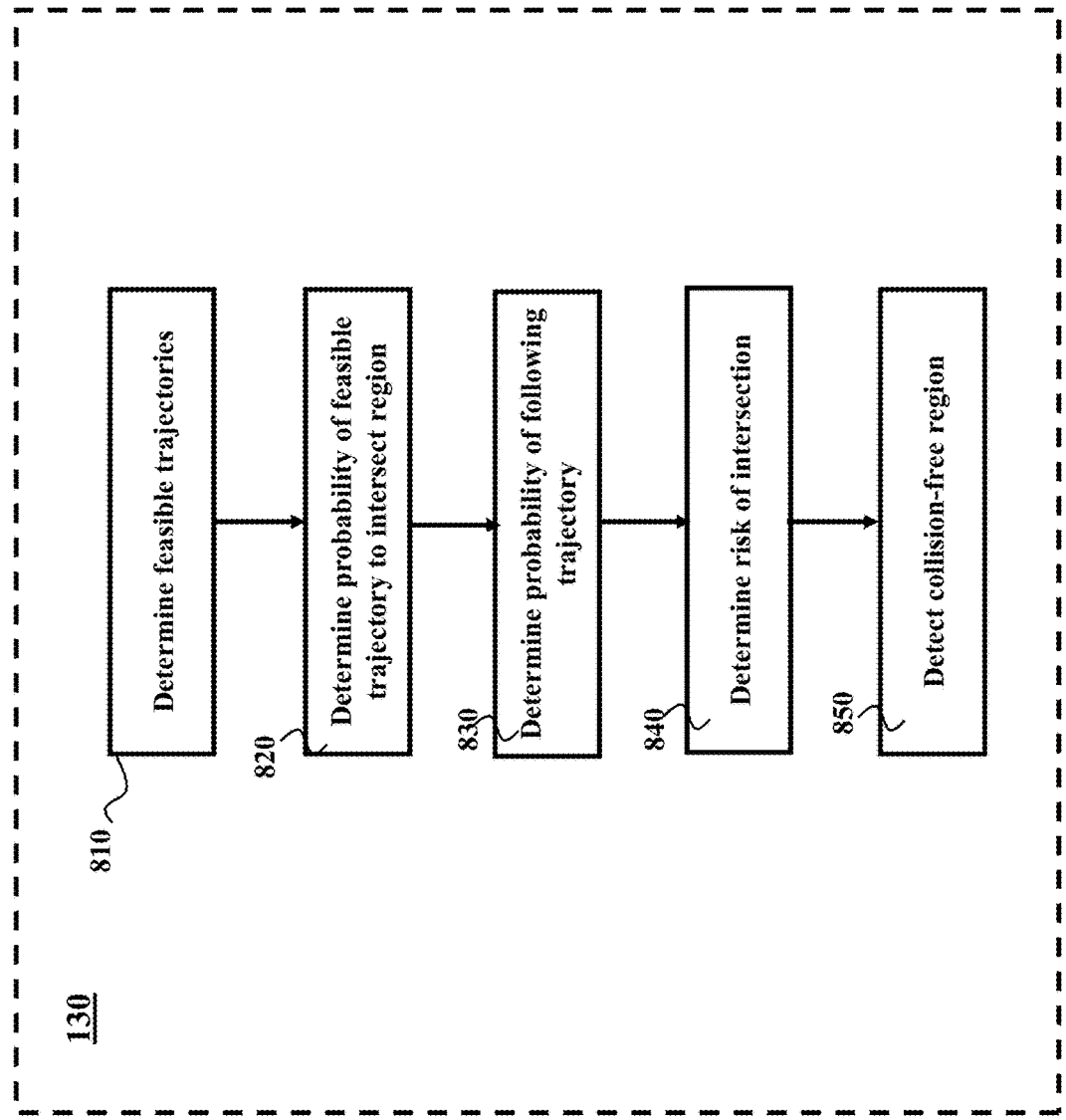
FIG. 8A shows an exemplar implementation of the collision detector for the determining the data structure indicative of collision free regions according to one embodiment.

FIG. 8A shows an exemplar implementation of the collision detector for the determining 130 the data structure indicative of collision free regions according to one embodiment. The exemplar implementation determines 810 set of feasible trajectories of hypothetical objects moving in a driving area of the vehicle. Then, the exemplar implementation determines 820 a probability of each feasible trajectory to intersect with each region at each time step of control. Then, the exemplar implementation determines, using the time-series signals, a probability of each feasible trajectory to be followed by at least one object. Finally, a level of risk of intersection of each feasible trajectory with each region at each time step of control as a combination of the probability of the feasible trajectory to intersect with each region at each time step of control and the probability of the feasible trajectory to be followed by at least one object is determined; and the exemplar implementation concludes with detecting a region at a time step of control as collision free if the level of risk of intersection of all feasible trajectories with the region at the time step of control is below a threshold.

In some embodiments, the feasible trajectories are determined using a kinematic model of a motion of a hypothetical vehicle, e.g., by generating the feasible trajectories for different velocities of the hypothetical vehicles at different locations of the environment traveling with different driving intentions selected from a set of driving intentions.

Additionally, or alternatively, some embodiments determine the feasible trajectories by iteratively sampling state space of a hypothetical object and adding a sampled state in a feasible trajectory for an intention of a motion of the hypothetical object when the sampled state is consistent with the intention of the motion.

Figure 8B:
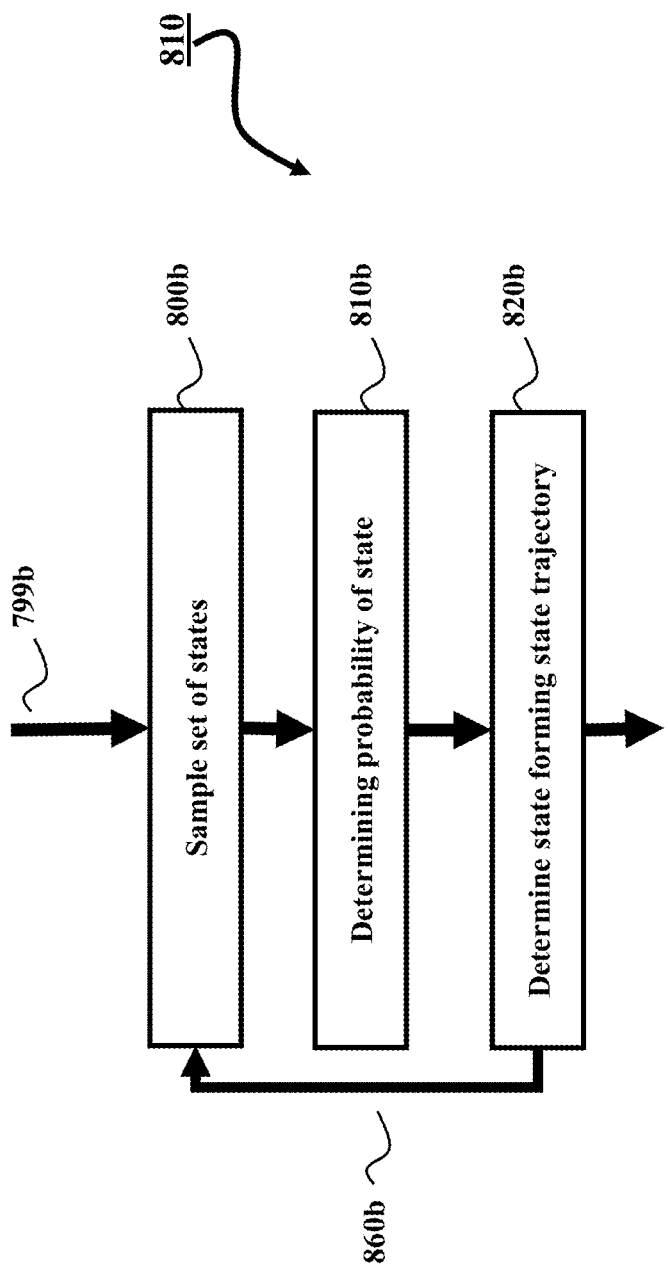
FIG. 8B shows a flowchart of a method for generating a feasible trajectory and determining its probability of intersection with a region according to some embodiments.

FIG. 8B shows a flowchart of a method 810 for generating a feasible trajectory and determining its probability of intersection with a region according to some embodiments. The method determines iteratively a sequence of states specifying the motion of the vehicle from an initial hypothetical state of the vehicle to a target lane of the vehicle, e.g., while satisfying various intentions of a hypothetical driver. In different embodiments, the initial hypothetical state is a state of vehicles observed in the past and/or wherein the initial hypothetical state is the state corresponding determined during a previous iteration of the method.

FIG. 8C shows a table listing various intentions of a hypothetical driver according to some embodiments. For example, some embodiments determine the feasible trajectories for each hypothetical vehicle performing different driving intentions permitted by the environment that move the hypothetical vehicle into the driving area of the host vehicle. For example, the set of driving intentions includes one or combination of a turn left intention, a turn right intention, a drive straight intention, a change lane left intention, a change lane right intention, a brake intention, an accelerate intention, and a maintain velocity intention.

The motion is defined by the state transitions connecting states of the vehicle. Each state includes a location, a velocity, and a heading of the vehicle. The motion is determined iteratively until a termination condition is met, for example, for a time period, for a predetermined number of iterations, or as long as the feasible trajectory is in the region of interest. The termination condition can be set in relation to the planning horizon in the path planner 350. For a manually driven vehicle, the termination condition can be set in relation to the visibility of the road segment.

Figure 8D:
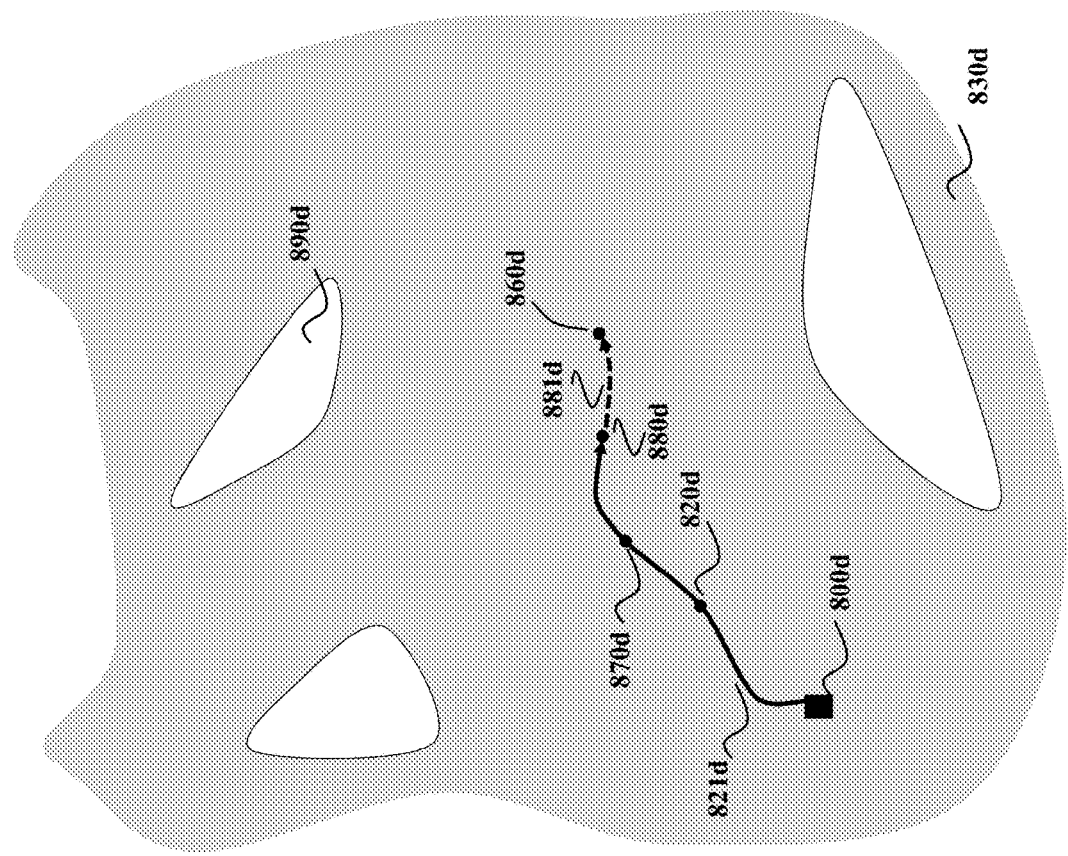
FIG. 8D shows a sequence of states transitions illustrating an iteration of the method of FIG. 8B.

FIG. 8D shows a sequence of states transitions illustrating an iteration of the method of FIG. 8B. The method determines 800b, starting from an initial state 800d, a set of sampled states 820d and 870d and a corresponding set of state transitions 821d such that the state and transition satisfy static and dynamic constraints on the state of the vehicle. For example, the method starts at the state 880d, determines the state 860d, and the state transition 881d in FIG. 8D, while avoiding obstacles 890d and satisfying constraints 830d on the motion of the vehicle from the map of the environment.

Figure 8E:
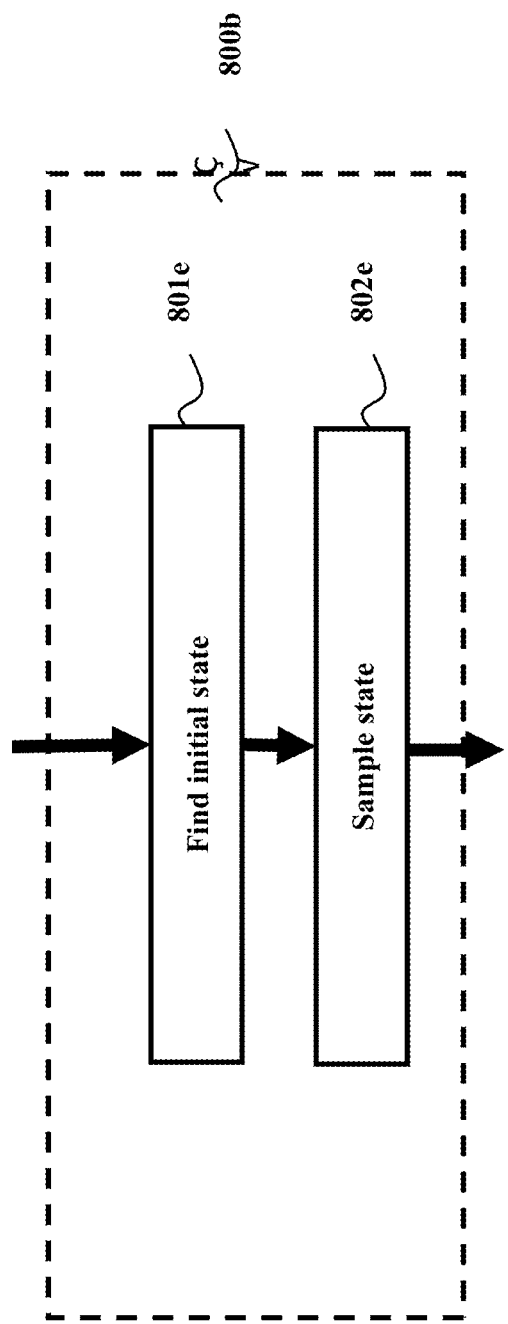
FIG. 8E shows a flowchart of an exemplar implementation of the determining the set of sampled states according to one embodiment.

FIG. 8E shows a flowchart of an exemplar implementation of the determining the set of sampled states 800b according to one embodiment. The determining 800b uses information about the environment, the states determined using previous iterations, and the drivers' intentions in FIG. 8C. Examples of the previous states include the nodes 880d, 870d, 820d, and the initial state 800d in FIG. 8D.

The exemplar implementation performs initial determining of a state 801e. If it is the first iteration of the method, the initial state is the current hypothetical state of the vehicle, with an uncertainty associated with it. The uncertainty can be in the shape of a confidence interval, or it can be in the shape of several possible locations. Such a scenario could arise, for example, if the sensing system provides very uncertain measurements, or if the map is uncertain. Otherwise, the initial state is determined by previous iterations of the method.

The method samples 802e a set of predicted states, satisfying the constraints on the motion of the vehicle, where can be predetermined or made adaptive. In some embodiments of the invention, the states 802e are generated from a fictive noise source of the dynamical system, that is from, with the nominal input as the mean value of the input. For example, $w_k$ can be chosen as arising from a Gaussian distribution $w_k \sim \mathcal{N}(u_k, Q_k)$, or it can be chosen as a probability density function (PDF) tailored to the particular intention associated with the feasible trajectory.

In other embodiments of the invention, the sampled states 802e are generated by using the intentions in FIG. 8C. The intentions of the driver are known beforehand, and the states generated from the noise source of the dynamical system corrected to better satisfy the intentions. For example, a probabilistic function $q(x_{k+1}|x_k, y_{k+1})$ can be used to generate states, where is a function of the state at time index k+1, given the state at the time index and the specification at time index k+1.

As a particular example, if both and are additive, Gaussian PDFs, q can be chosen as $q(x_{k+1}|x_k^i, y_{k+1}) = P(x_{k+1}|x_k^i, y_{k+1}) = \mathcal{N}(x_{k-1}|x_{k+1}^i, (\Sigma)_{k+1}^{-1})$ where $$x_{k+1}^i = f(x_k^i) + w_k^i + L_k^i(y_{k+1} - H_k^i f(x_k^i)), \Sigma_{k+1}^i = ((H_k^i)^T R_{k+1}^{-1}(H_k^i) + Q_k^{-1})^{-1} \text{ and}$$

$$L_k^i = (Q_k(H_k^i)^T (H_k^i Q_k (H_k^i)^T + R_{k+1}^{-1})^{-1},$$

that is, the state can be generated as a random sample from the noise source of the dynamical system, propagated through the mathematical description of the vehicle, modified with a deterministic term to account for the deviation from the intention, and the corresponding state is predicted using this modified term.

Figure 8F:
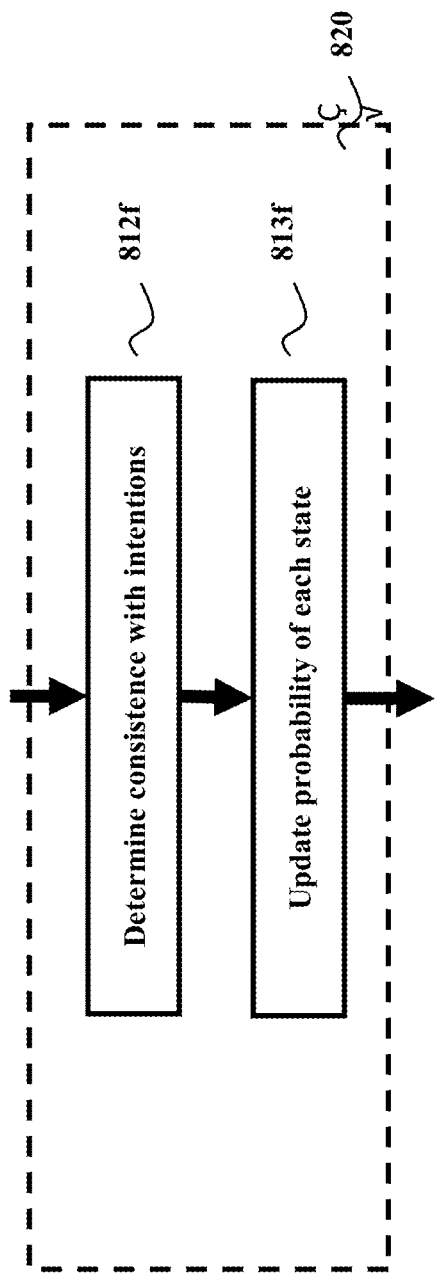
FIG. 8F shows a flow chart of a method for updating the probability of sampled states being consistent with the driver's intentions shown in FIG. 8C.

In one embodiment, the generation of the sampled states 802e and prediction of corresponding state is executed in a loop, where the number of iterations is determined beforehand. In another embodiment, the generation of states 802e is done based on the intended trajectory time steps ahead in time. For example, the number of iterations can be determined as a fixed number of steps, or the iterations can be determined as a function of the resolution of the sensors of the sensing system 330. When 802e is executed time steps, the states are generated according to all locations corresponding to the intended trajectory from time index k+1 to time index k+T, that is, $q(x_{k+1}|x_k, y_{k+1}, \ldots, y_{k+T})$ FIG. 8F shows a flow chart of a method for updating the probability of sampled states being consistent with the driver's intentions shown in FIG. 8C. Specifically, the method determines 812f whether the sampled state is consistent with a state that leads to the target state consistent with the drivers' intentions and updates 813f the probability of the state based on evaluation of the consistency. For example, if the intention of the driver is to change to the left lane, the target state can be in a middle of the left lane and the intermediate states that lead to the target state are consistent with the drivers' intention, while other states are not.

In some embodiments, the determining 812e is done as a combination of the PDF of the intentions/constraints, $p(y_{k+1}|x_{+1}^i)$, the next state, and the probability $\omega_k^i$ of the state determined during the previous iteration. For example, if states are generated according to the dynamic model of the vehicle, the probabilities are proportional to the PDF of the specifications, that is, $\omega_{k+1}^i \propto p(y_{k+1}|x_{+1}^i)\omega_k^i$. As another example, if the sampling of states is done according to $p(x_{k+1}|x_k^i, y_{k+1})$, the probabilities are proportional to the prediction of the PDF of the intended trajectories, that is, $\omega_{k+1}^i \propto p(y_{k+1}|x_k^i)\omega_k^i$. In one embodiment, the probabilities are normalized in such a way that they represent a PDF.

In one embodiment, states with nonzero but low probability are in some time steps replaced with states with higher probabilities. For example, one embodiment generates a new set of states in such a way that the probability of generating $x_k^i$ is $\omega_k^i$. In another embodiment, the replacement is performed whenever the inverse square sum of the probabilities is below some predefined threshold. Doing in such a manner ensures that only probably good states are used.

The determining 820b of state can be done in several ways. For example, one embodiment determines states by using a weighted average function to produce the state as $x_{k+1}=\Sigma_{i=1}^N \omega_{k+1}^i x_{k+1}^i$. Another embodiment determines state as the state with highest probability, that is, i=argmax $\omega_{k+1}^i$. Additionally or alternatively, one embodiment determines the state by averaging over a fixed number m<N of sampled states.

Figure 8G:
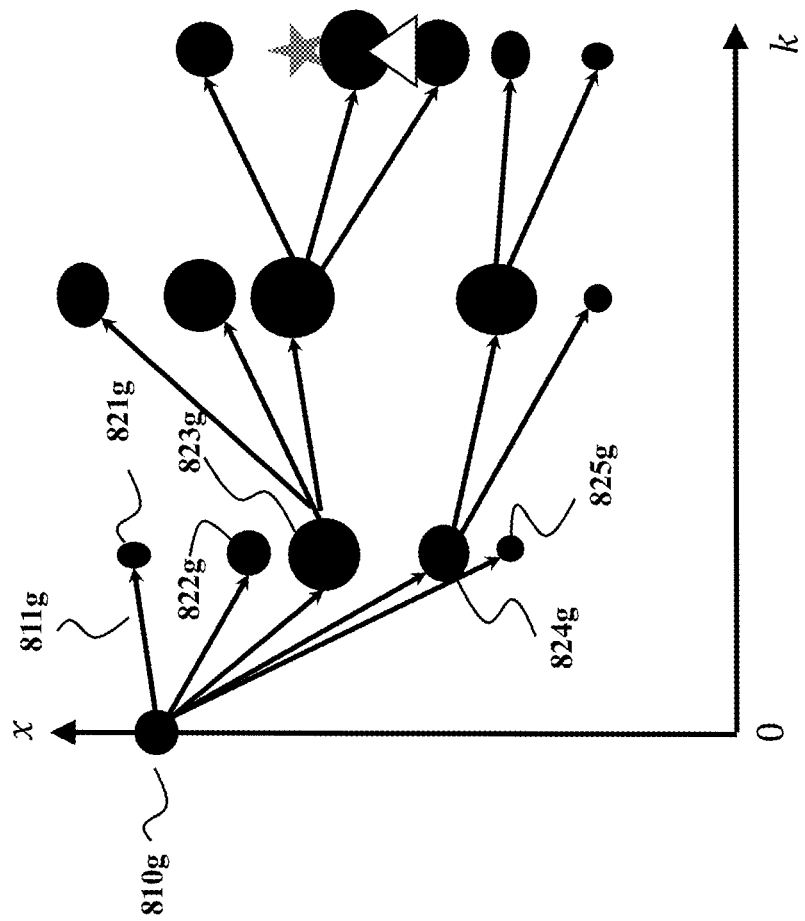
FIG. 8G shows a simplified schematic of iteration of the method producing one state for each discrete section of the probability density function (PDF).

FIG. 8G shows a simplified schematic of iteration of the method producing one state for each discrete section of the PDF. In this example, the states 823g and 824g are selected for a single iteration. Selection of multiple states for at least one iteration results in the set of motions connecting the current state of the vehicle with the target state of the vehicle. To that end, one embodiment selects from the set of motions the motion optimizing a cost function.

FIG. 8H shows possible assigned probabilities of the five states at the first iteration in FIG. 8G. Those probabilities 821h, 822h, 823h, 824h, and 825h are reflected in selecting the sizes of the dots illustrating the states 821g, 822g, 823g, 824g, and 825g.

Referring back to FIG. 8G, the states 823g and 824g become the initial state for the next iteration that again produces five sampled state transitions of the vehicle from the initial states to next states.

Figure 8I:
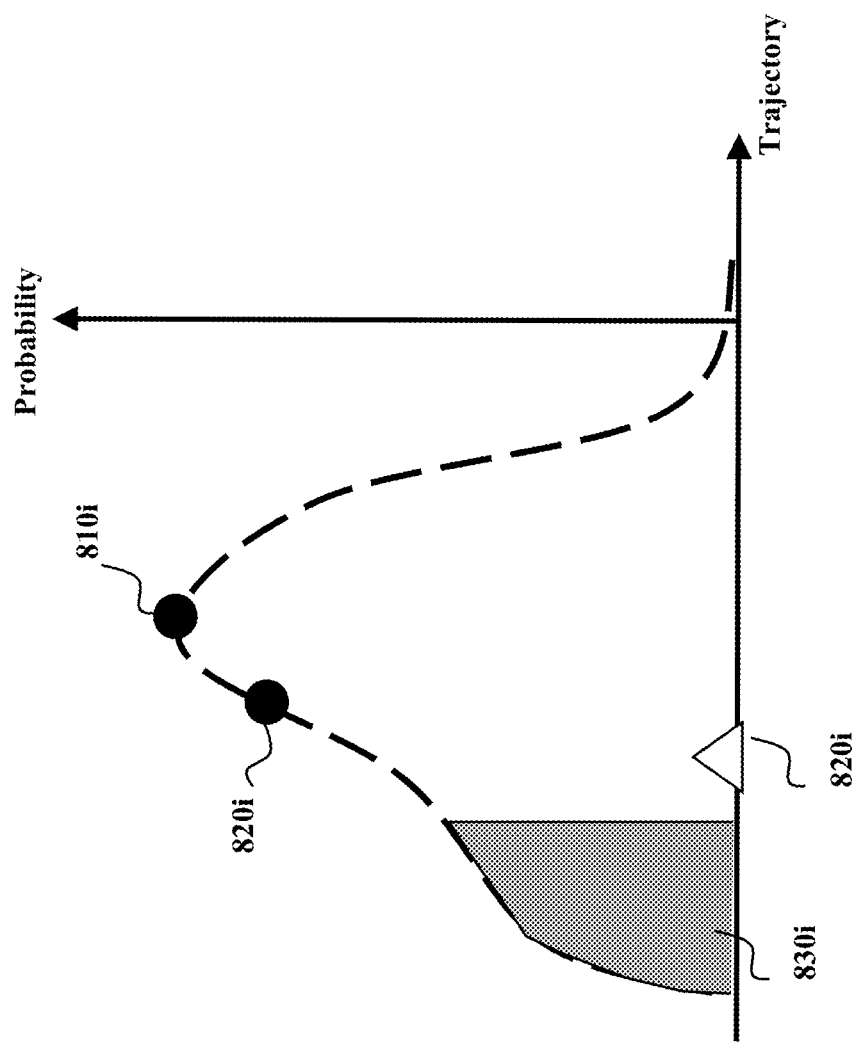
FIG. 8I shows a graph of a total probability density function used by one embodiment.

FIG. 8I shows a graph of a total probability density function used by one embodiment. For example, to determine the probability of a feasible trajectory to intersect with each region of time step of control, the feasible trajectories include a probability distribution from the determining 810b. In one embodiment, referring to FIG. 8I, the feasible trajectory is determined from the total probability density as the trajectory with highest probability 810i, and in one embodiment it is determined as the aggregated states 820i over the density. In one embodiment, the probability is determined as how large portion 830i of the PDF at a particular time instant is intersecting with the region at a particular time step. For instance, if the whole PDF intersects, the probability is 1.

The probability of a feasible trajectory intersecting with the intended trajectory of the host vehicle is not enough to determine the level of risk of a feasible trajectory, because it does not tell whether any vehicle will follow the feasible trajectory.

Figure 9:
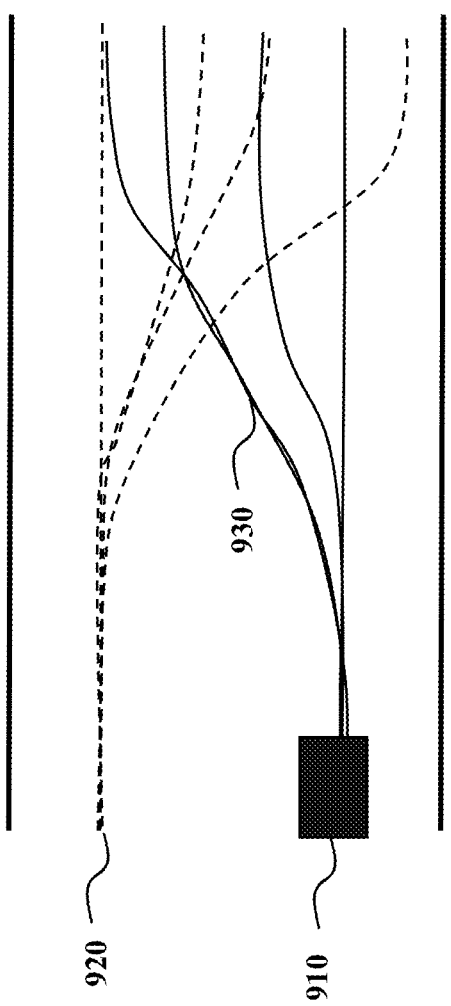
FIG. 9 shows an example of possible feasible trajectories of a vehicle.

FIG. 9 shows an example of possible feasible trajectories of a vehicle. Consider FIG. 9, in which there are 8 possible trajectories for a vehicle 910 to follow. The hypothetical trajectories 920 are not consistent with the measured vehicle 910, so the subset of feasible trajectories include 930. Assume that the probability of intersection of 930 with the trajectory of the host vehicle has been determined. Then, in one embodiment the level of risk is determined as a combination of the probability of the feasible trajectory to intersect with the trajectory of the host vehicle and the probability of the feasible trajectory to be followed by at least one vehicle.

One embodiment classifies the time-series signal of the vehicle to produce a driving intention of the vehicle and updates the probabilities of each feasible trajectory from the subset based on consistency of the feasible trajectories from the subset with the intention of the vehicle. The idea is that previously observed data can be used to predict the decisions made in the future. For example, by learning what characteristics of a driver that changes lanes are, future lane changes can be predicted.

Figure 10A:
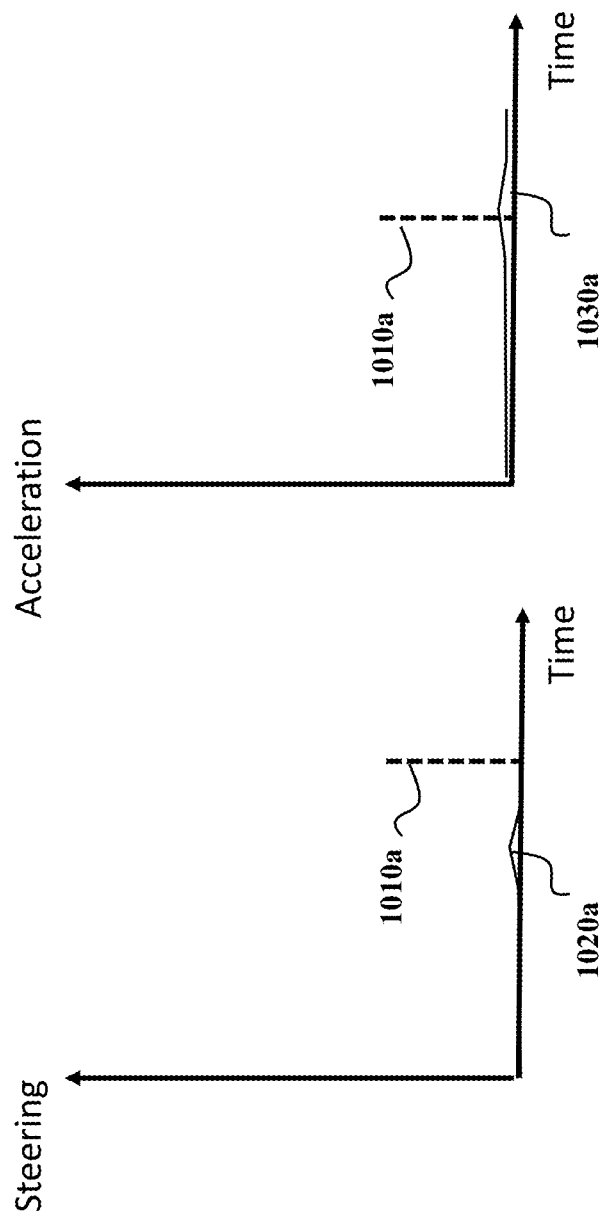
FIG. 10A shows a time-series signal of a steering trajectory of the steering wheel of the vehicle and an acceleration trajectory of the vehicle used by some embodiments to determine an intention of a driver of a vehicle.

FIG. 10A shows a time-series signal of a steering trajectory of the steering wheel of the vehicle and an acceleration trajectory of the vehicle used by some embodiments to determine an intention of a driver of a vehicle. The driver initiates a lane change at time 1010a. However, it can be noted that before the lane change, there is a slight increase 1020a in the steering angle for a short moment. This can, for example, be due to that the driver of the vehicle looks over the shoulder to see whether there are any vehicles in the blind-spot. Furthermore, it can be seen that the acceleration 1030a slowly starts to increase before the lane change is initiated and then maintained throughout the lane change. Hence, information from recorded data can be used to predict future intentions.

Figure 10B:
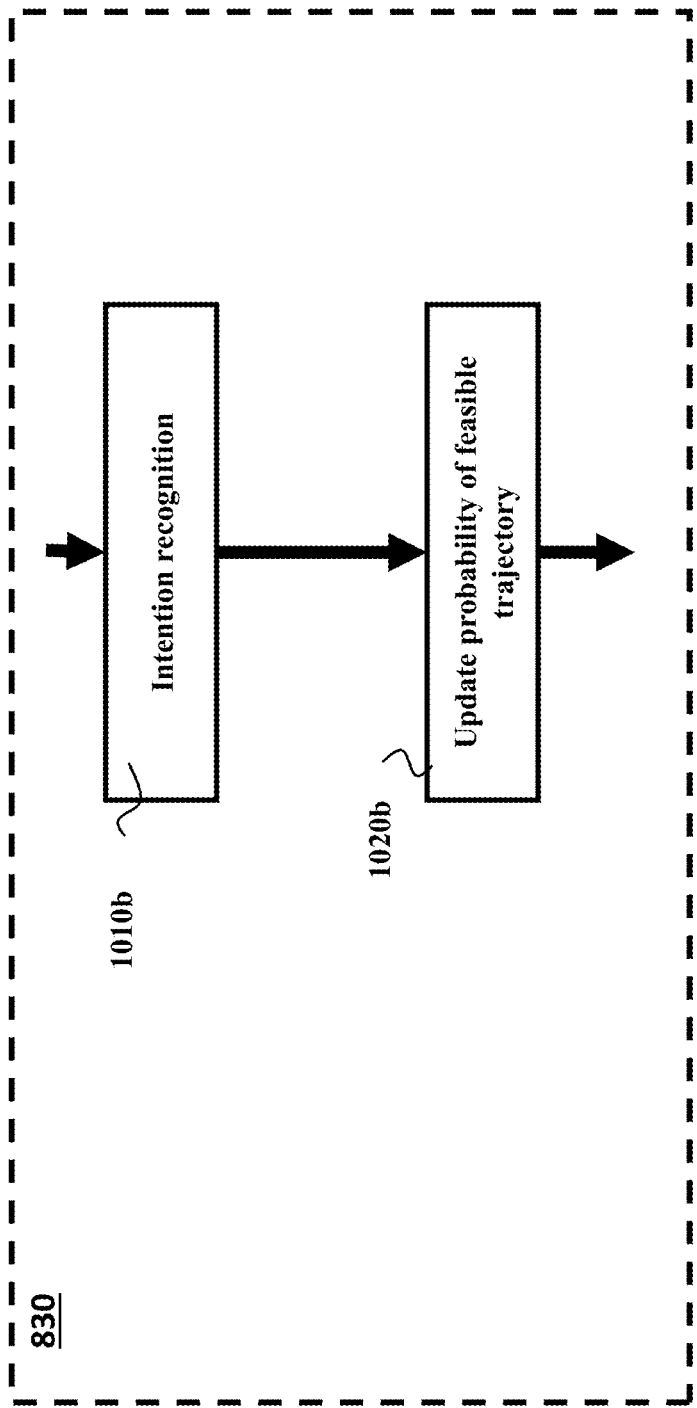
FIG. 10B shows a flowchart of an exemplar implementation of a method for updating the probabilities of each feasible trajectory to be followed based on consistency of the feasible trajectories from the subset with the intention of the vehicle from the time-series signal according to some embodiments.

FIG. 10B shows a flowchart of an exemplar implementation of a method 1010b for updating the probabilities 830 of each feasible trajectory to be followed based on consistency of the feasible trajectories from the subset with the intention of the vehicle from the time-series signal according to some embodiments. The method determines 1010b the intention of the vehicle. For example, as exemplified in FIG. 8C, one embodiment considers the following intentions: turn left 810c, turn right 820c, drive straight 830c, change lane left 840c, change lane right 850c, in addition to brake 860c, accelerate 870c, or maintain velocity 880c. Some embodiments learn how to choose intention by observing behavior of many vehicles. For example, one embodiment uses vehicle data with known intentions to train a random forest algorithm, which is based on deep decision trees, another embodiment trains a support vector machine, and a third embodiment trains a neural network.

Then the method updates 1020b the probability of the feasible trajectory to be followed by the vehicle. In one embodiment, the probability is updated by the probability 810i of the feasible trajectory generated from 810i, that is, the probability of the most likely trajectory. In another embodiment, the updating is done by the weighted average 820i over the PDF of the feasible trajectory.

One embodiment takes the probability of a feasible trajectory to intersect with a probability of a feasible trajectory to be followed, and weights these probabilities together. For instance, one embodiment uses a weighted mean of the probabilities.

Several embodiments of the invention use the level of risk to adjust the trajectory of the host vehicle. For instance, in one embodiment, if the level of risk is above some threshold, the time-to-collision between the feasible trajectory of the vehicle with the trajectory of the motion planner of the host vehicle is calculated. One embodiment renders the level of risk as time-to-collision to the driver of the vehicle as a warning sound, signal on the dashboard, or both, then adjusts the trajectory in response to commands on input commands received from the driver. In another embodiment, the level of risk above a threshold is propagated to a collision avoidance module of the host vehicle and adjusts the trajectory in response to input commands received from the collision avoidance module. For instance, the collision avoidance module can be the motion planner 350, or another controller 360 of the vehicle. The input commands can include steering wheel and throttle commands.

In some embodiments, the path planner finds the time sequence of points and corresponding trajectory by optimizing a cost function of the motion of the vehicle within the union. For instance, as outlined in FIG. 6A, one cost function is the minimum time to reach a lateral displacement. Another cost function can be to optimize the smoothness of the vehicle motion, for example, due to the need of providing a comfortable ride for passengers.

The trajectory 640a corresponding to the time sequence 630a can be determined in several ways. In one embodiment, the trajectory is determined by tracking the equilibrium points and switching between the equilibrium points at time steps of control determined by the path planner, as illustrated in FIG. 4D and FIG. 6A.

In other embodiments, the control system includes a speedometer to measure a longitudinal velocity of the vehicle, wherein the collision detector determines the longitudinal displacement of the vehicle at the time step of control based on a product of the longitudinal velocity with a time period corresponding to the time step of control. However, one embodiment assumes no speedometer and instead bases the collision detection on constant velocity, for example, estimated from the commanded longitudinal velocity of the vehicle.

In yet another embodiment, a position sensor such as GPS is equipped to the vehicle to determine a current location of the vehicle, and another embodiment uses a transceiver to transmit the current location of the vehicle and to receive, in response to the transmitting, the set of regions determined for a shape of the road including the current location.

Variable Velocity

Some embodiments are based on the understanding that the shape of the regions used to form a chained collision-free thread of time changes with the vehicle speed. For instance, when a vehicle drives with high speed, it is possible to perform faster lane changes, in time, than at low speeds, which implies that the collision-free region is different.

Figure 11A:
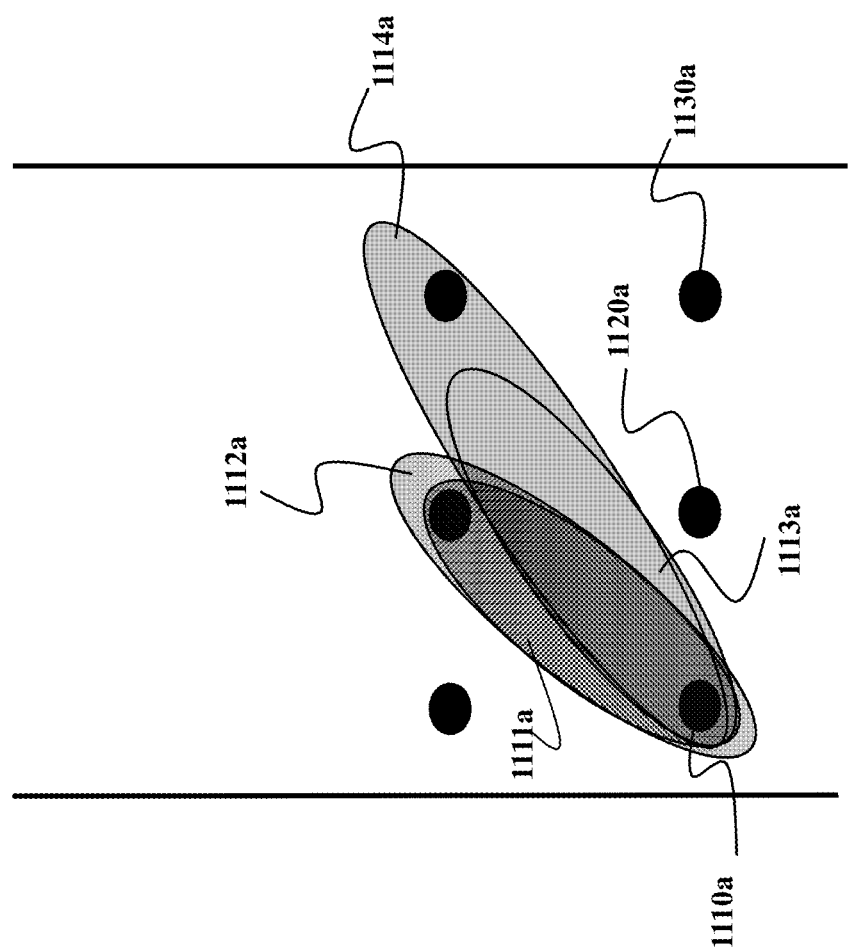
FIG. 11A shows an illustration of the changing the region size with different velocity speeds.

FIG. 11A shows an illustration of the changing the region size with different velocity speeds. There are three lateral displacements 1110a, 1120a, and 1130a, on the road. For one vehicle speed v1, it is possible to move from lateral displacement 1110a to 1120a, by staying in the region 1111a. For the same speed, it is not possible to safely move directly from 1110a to 1130a, since the region 1113a does not cover the lateral displacement 1130a. However, for a different vehicle speed v2, it is possible to move from 1110a to both 1120a and 1130a, since the regions 1112a and 1114a associated with that speed cover both these lateral displacements.

Figure 11B:
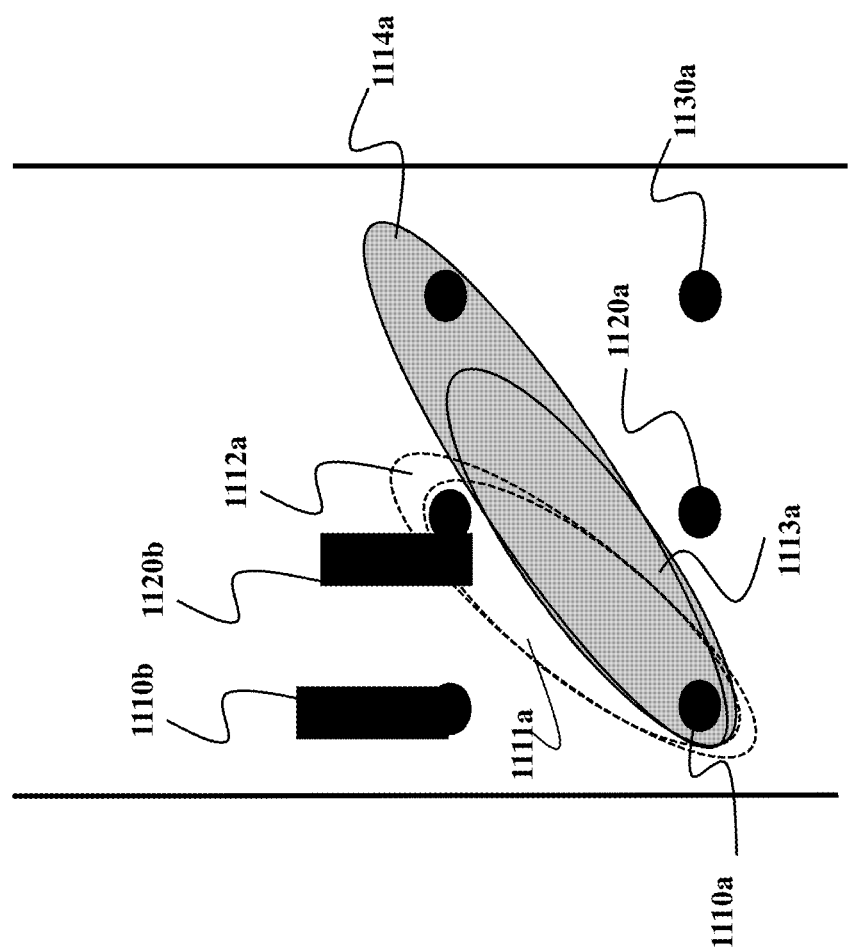
FIG. 11B illustrates the determining a safe sequence of regions for different velocities.

FIG. 11B illustrates the determining a safe sequence of regions for different velocities using the three lateral displacements 1110a, 1120a, and 1130a. Two obstacles 1110b and 1120b make it impossible to stay at the same lateral displacement 1110a or move to lateral displacement 1120a with speed v1, since the regions 1111a intersects with an obstacle. At the same time, it is not possible to move to lateral displacement 1130a with the speed v1, since the region 1113a does not overlap 1130a. However, by changing to vehicle speed v2, it is possible to move to lateral displacement 1130, since the region 1114a associated with speed v2 overlaps 1130a. Hence, it is possible to safely avoid collision with the obstacles 1110b and 1120b by changing vehicle speed.

With different velocities, it is possible to include flexibility in how to place the lateral displacements on the road. For instance, since the regions associated with different velocities change in size, it is possible, and can be advantageous, to place some lateral displacements closer together for a particular vehicle speed.

Figure 12A:
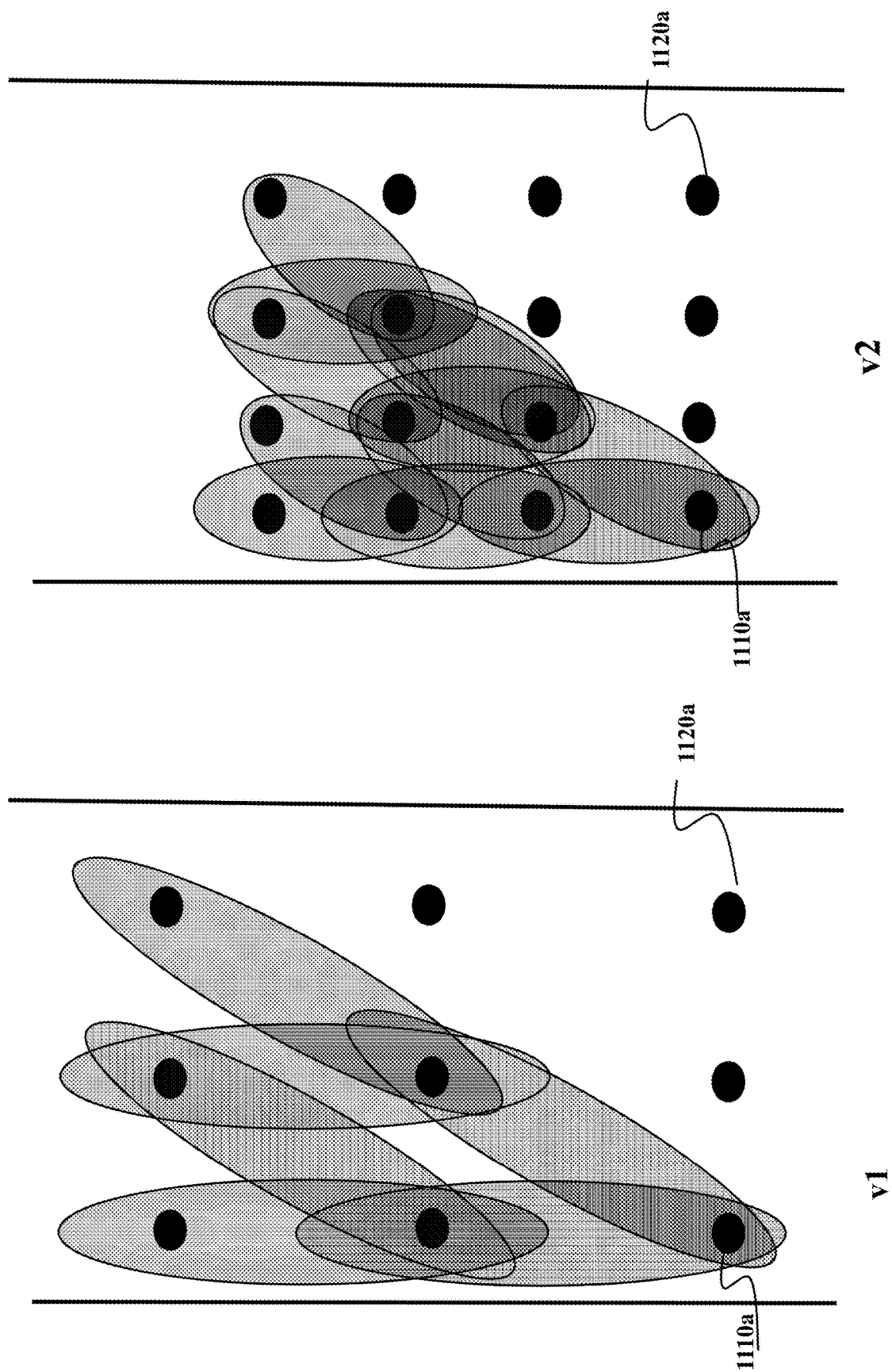
FIG. 12A illustrates the selection of lateral displacements for different vehicle speeds.

FIG. 12A illustrates the selection of lateral displacements for different vehicle speeds. For velocity v1, it suffices with three lateral displacements on the road and three time steps to move from displacement 1210a to 1220a. However, for velocity v2, it requires either four lateral displacements, since otherwise it is not possible to form a collision-free sequence of regions in space and time.

In one embodiment, the number of lateral displacements is determined by maximizing the spacing between the lateral displacements for a specific speed, while making sure that it is possible for each lateral displacement not being the end displacement on the road to move to at least one adjacent lateral displacement on each side of the current lateral displacement in a predefined number of time steps of control. In other words, the placement of the lateral displacements is determined as the solution to an optimization problem trying to minimize the number of lateral displacements under the constraint that the displacements are still connected.

In another embodiment, the number of lateral displacements is determined as the number of lateral displacements maximizing smoothness for the passengers of the vehicle while still ensuring that the displacements overlap for the relevant time steps of control. The smoothness is determined by minimizing a parameter associated with the smoothness. For instance, one embodiment models the steering rate as a control input to the vehicle, which is included in the model of the dynamics of the vehicle, and minimizes the control magnitude such that the control invariant sets constituting the safe regions still form a connection enabling a safe collision-free sequence of regions.

Storing all different regions for each lateral displacement and each different velocity would be computationally and memory prohibitive. To this end, some embodiments realize that it is enough to store a subset of the regions, and use the same regions for different velocities and lateral displacements.

Figure 13A:
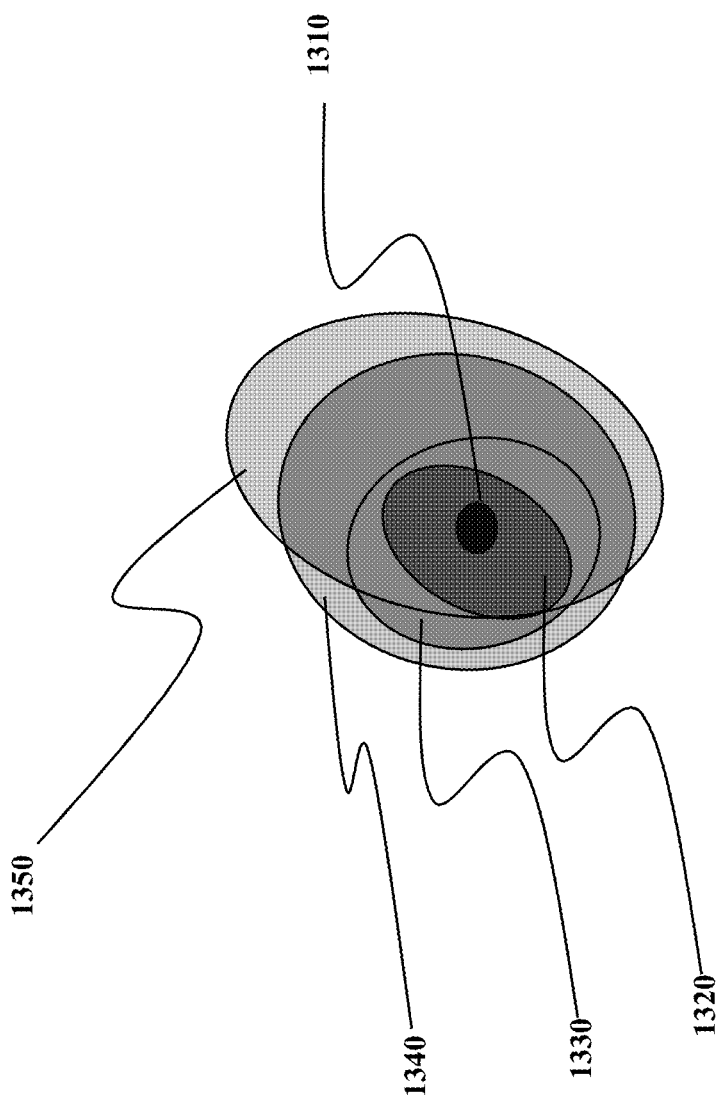
FIG. 13A shows a schematic of how to choose which regions to store in memory.

FIG. 13A shows a schematic of selecting regions to store in a memory according to some embodiments. In this example, the lateral displacement 1310 has four regions 1320, 1330, 1340, and 1350, each associated with a different vehicle speed. Region 1340 includes regions 1330 and 1320, which ensures that the region 1340 can be used also for velocities associated to regions 1320 and 1330. In this way, the memory needed to store the regions is decreased.

In one embodiment, the same regions is used for multiple speeds, and the determining the connectivity between lateral displacements for different time steps of control is using the same region for different speeds. Indeed, if an obstacle does not intersect the region 1340, the obstacle also does not intersect any sub-region of the region 1340. However, the region 1350 is not included in any of the other regions, and does not itself cover any other region. Hence, for the lateral displacement 1310, it is enough to use two regions 1340 and 1350, despite originally having four different regions.

Figure 13B:
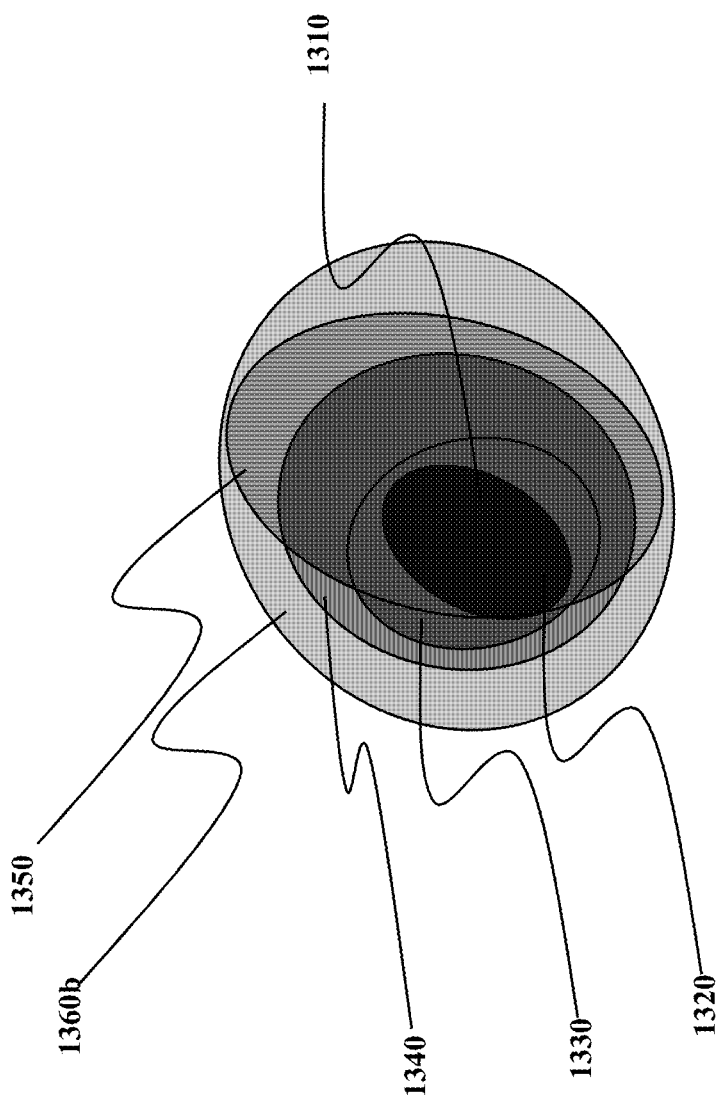
FIG. 13B shows a schematic of selecting regions to store in a memory according to some embodiments.

In one embodiment, to further decrease the number of regions needed to be stored in memory, an optimization routine is used to find a region such that also the region 1350 is included into the multiple regions. FIG. 13B shows a situation where an additional region 1360b has been determined such that all the other regions are covered in this region. In some implementations, this problem is posed as an estimation problem, where the objective is to minimize the volume of the region 1360b while covering all the other regions associated with the other velocities, which includes finding a controller associated with the region. Doing in such a manner ensures conservativeness such that collisions are minimized and that the memory requirements are minimized.

When testing the obstacles intersecting the region 1340, the obstacle location relative to the vehicle at a specific time step of control will be different for different vehicle speeds. Hence, while the using the same regions for different speeds introduce some conservativeness, the different relative positions still ensure that it is possible to distinguish the different regions for different speeds.

In some embodiments, the different speeds are ordered in sequence according to how desirable they are. For instance, assuming that the speed limit for a particular road is the desired speed, and it is in violation with the traffic rules to go above the speed limit, a natural ordering is to start with the speed limit and traverse in decreasing order until a minimum speed is reached. Only thereafter, provided that no collision-free sequence of regions has been found, are the speeds above the speed limit are tested.

Figure 14A:
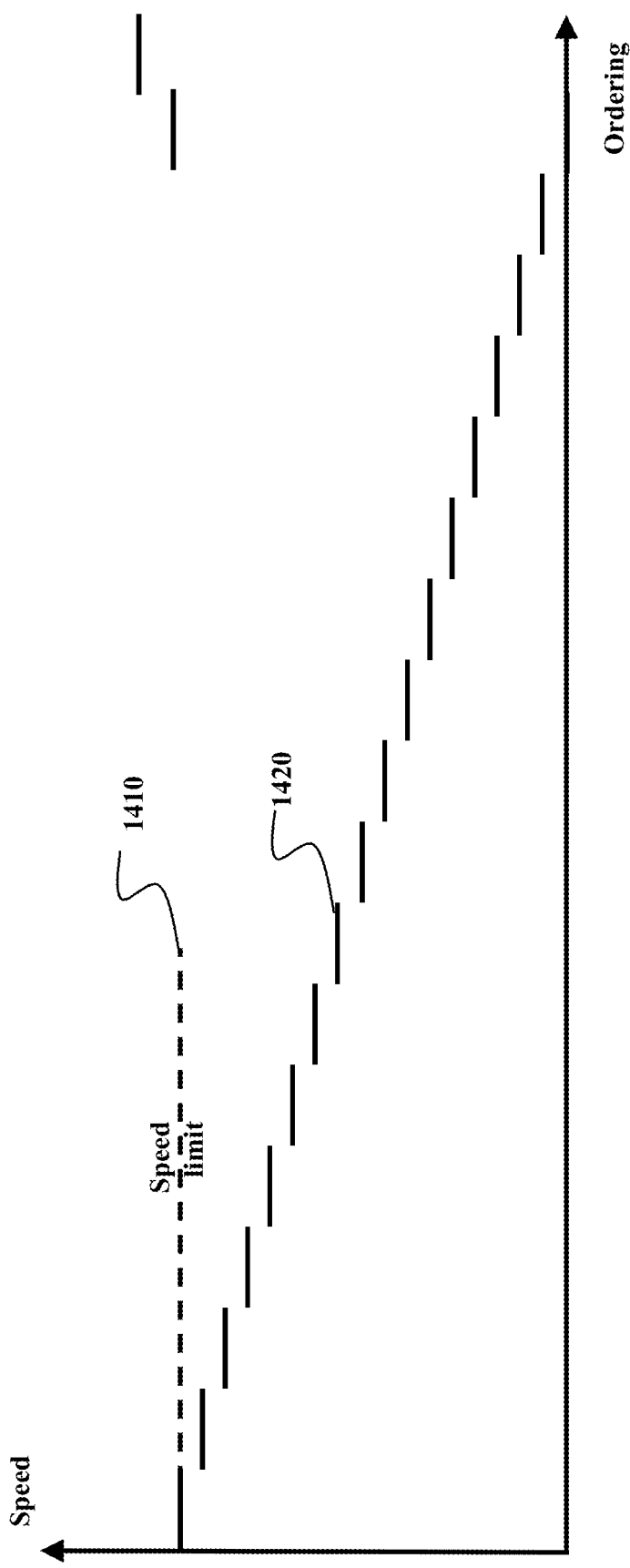
FIG. 14A shows an illustration of a possible speed ordering.

FIG. 14A shows an illustration of a possible speed ordering. The first priority is to maintain the speed limit. If that is not possible, that is, if there is no sequence of a union of regions forming a collision-free sequence of lateral displacements, one embodiment iterates through the sequence of nominal vehicle velocities 1420 until a solution is found. Referring back to FIG. 12A, doing in such a manner ensures that the number of lateral displacements can vary for different vehicle speeds, to ensure the connectivity for different speeds.

Figure 14B:
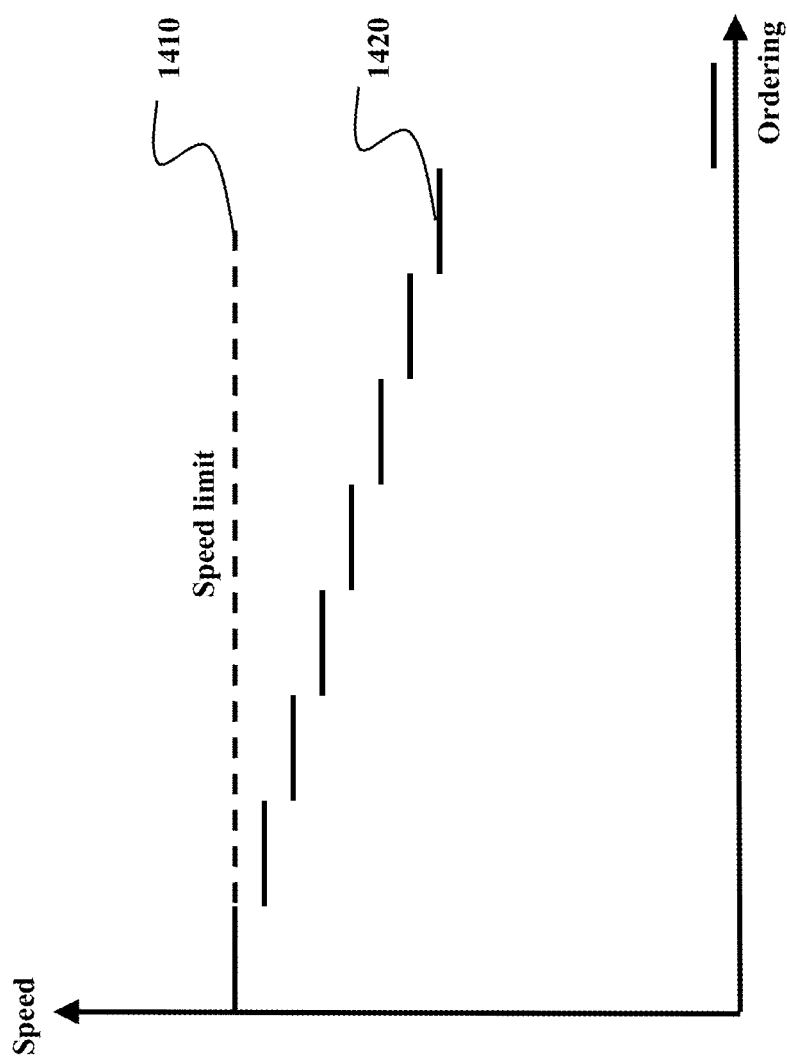
FIG. 14B shows an illustration of a possible speed ordering.

In one embodiment, the zero speed is in the sequence of velocities to traverse. FIG. 14B shows another ordering 1420, which does not include all velocities down to standstill.

The resolution of the set of nominal speeds, that is, the number of nominal vehicle speeds to test for a collision-free sequence, can depend on the size of the safe regions. For instance, referring to FIG. 13A, if region 1350 corresponds to nominal speed v1, region 1340 to nominal speed v2, region 1330 to nominal speed v3, and region 1320 to speed v4, it is not possible to immediately change speed from v1 to any of v2, v3, or v4, since region 1350 does not cover any of the regions 1340, 1330, or 1320. However, referring to FIG. 5E, by determining the shrinking of the different regions for different time steps of control, it may be possible to reach speed v2 corresponding to region 1340 from speed v1 corresponding to region 1350 in a certain number of time steps of control. For instance, if region 530e in FIG. 5E is region 1350 and region 510e is region 1340, by the changing the size and shape of the region 530e for different time steps of control, it is possible to reach speed v2 in two time steps of control, since region 550e corresponds to region 530e after two time steps of control.

In another embodiment, the resolution, or discretization level, of the vehicle speeds are determined based on smoothness conditions ensuring a pleasant ride for the passengers of the vehicle. For instance, one embodiment models the longitudinal speed controller of the vehicle when determining the resolution of nominal vehicle speeds. A maximum and a minimum value of the allowed acceleration is determined, and the resolution of speeds is determined as the maximum resolution not violating any of the minimum and maximum value.

Figure 14C:
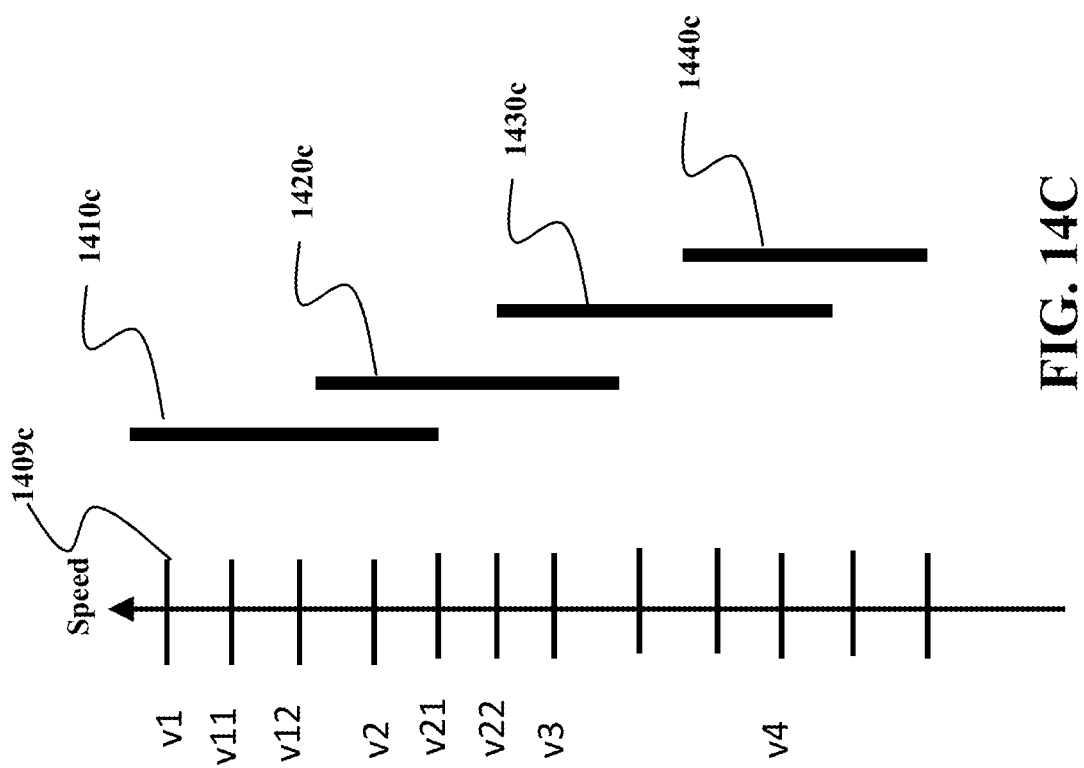
FIG. 14C shows an illustration of how to ensure safe transitioning between different speeds according to some embodiments of the invention.

FIG. 14C shows an illustration of how to ensure safe transitioning between different speeds according to some embodiments of the invention. Associated with the different vehicle speeds 1409c are several regions 1410c, 1420c, 1430c, and 1440c, each region used for multiple speeds as determined by other embodiments of the invention. For instance, region 1410c is applicable for speeds v1, v11, v12, and v2. Assume now that vehicle is traveling with speed v2, and there is no collision-free sequence of regions for neither of the speeds in the range of v1 and v2. However, the region 1420c is applicable for speeds v2, v21, v22, and v3. Hence, if there is a collision-free sequence of regions resulting in a collision-free trajectory, then it is possible to ensure safe transitioning from a speed v2 to any of the speeds v21, v22, and v3.

In one embodiment, the preferred speed is set by a passenger of the vehicle, e.g., using voice or the dashboard. In another embodiment, the preferred speed is the speed corresponding to the speed limit.

In one embodiment, the obstacle locations are determined in the coordinate system of the vehicle relative to a nominal speed, such as the preferred speed. The obstacle locations and subsequent invalidating the regions relative to a second speed are then determined by translating the obstacle locations for different time steps of control by considering the difference between the preferred speed and the second speed. Doing in such a manner, and by using nominal speeds, ensures that computations are reduced.

Figure 15:
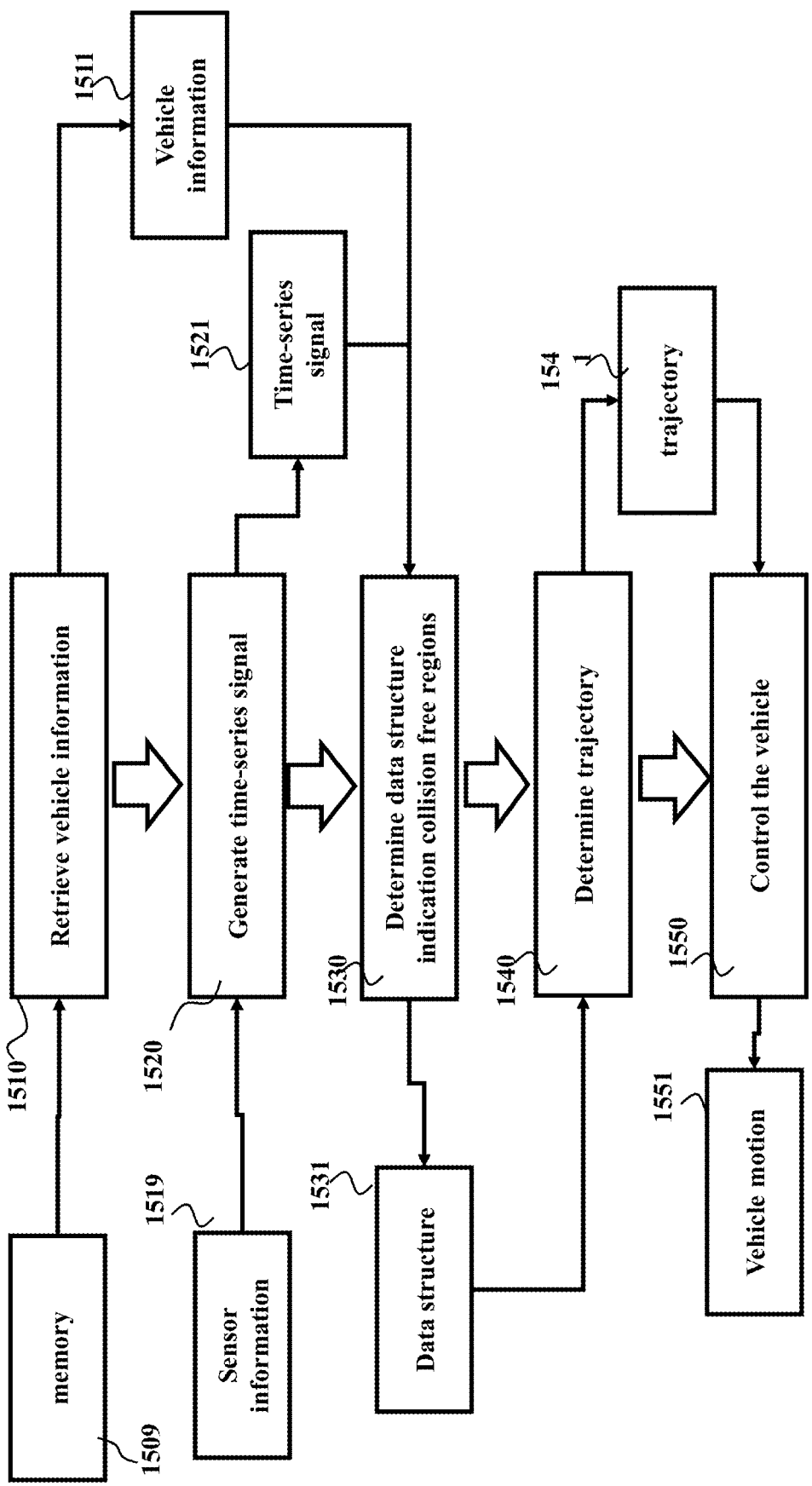
FIG. 15 shows a flowchart of a method for controlling a vehicle.

FIG. 15 shows a flowchart of a method for controlling a vehicle traveling on a road shared with a set of moving obstacles or objects, hereafter interchangeably denoted with vehicles. The method uses a memory to store information necessary for implementing steps of the method. The method retrieves 1510 from memory 1509 a set of desired speeds and a set of equilibrium points defining lateral displacements and orientation of the vehicle on the road and a set of regions of states of the lateral dynamics of the vehicle corresponding to the equilibrium points, wherein each state of the lateral dynamics includes a lateral displacement, a rate of change of the lateral displacement, a lateral orientation, and a rate of change of the lateral orientation. Each region defines a control invariant set of the states of the lateral dynamic determined for at least one of the desired speeds such that the vehicle having a state within a region is capable to maintain its states within the region. In some implementations, each region includes a corresponding equilibrium point and intersects with at least one adjacent region.

The method generates 1520, using the information 1519 from at least one sensor either directly connected to the vehicle or remotely connected to the vehicle, a time-series signal 1521 indicative of motion of each object in the set of moving objects detected by the sensors. The measurements can include camera measurements or laser/LIDAR measurements. The measurements can include measurements from vehicle to vehicle communication, and the measurements can include GPS data. The length of the measurement sequence can vary from vehicle to vehicle.

Using the time-series signal 1521 and the retrieved information 1511 from memory, the method determines 1530 a data structure indicating collision-free regions at different time steps of control. In the determining 1530, a collision detector detects a collision of each region with at least one object at each time step of control in a time horizon when a trajectory of the object at the time step of control intersects a space defined by a longitudinal displacement of the vehicle at the time step of control for a predetermined desired speed and a range of values of the lateral displacement of the region. Then, using the determined data structure 1531, the method determines 1540, using a path planner, for at least one reference speed, a time sequence defining a collision free sequence of regions forming a union of regions in space and time connecting a region including an initial displacement with a region including a target displacement to produce a trajectory 1541 within the union connecting the initial displacement with the target displacement. Finally, the method controls 1550 the vehicle to produce a vehicle motion 1551 according to the trajectory 1541.

Figure 16:
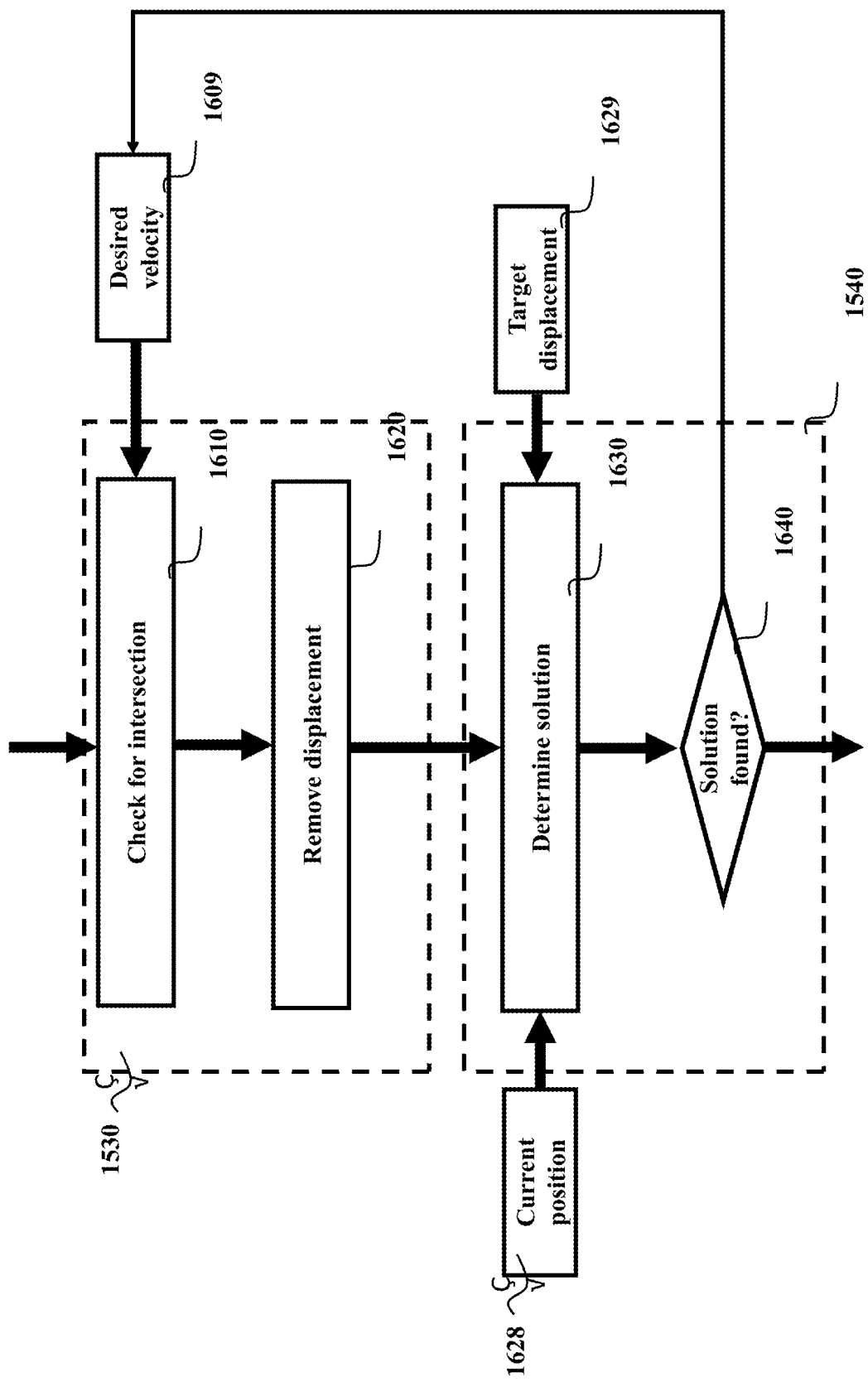
FIG. 16 shows an exemplar implementation of a method for the determining the data structure indicating collision-free regions.

FIG. 16 shows an exemplar implementation of a method for the determining 1530 the data structure indicating collision-free regions and the determining 1540 a collision-free sequence of lateral displacements and corresponding vehicle trajectory according to embodiments of the invention. The method picks 1609 a desired speed of the vehicle. Then, the method checks 1610, using the lateral displacements and associated regions for the desired speed, the prediction of the obstacles to intersect with the regions. The method removes 1620 the corresponding lateral displacements for each time step of control that at least one obstacle intersects with the associated region. Then, using the current position 1628 and a target displacement 1629, the method determines 1630 the initial displacement associated with the current position, and tries to find a solution to the target displacement. In one embodiment, the initial displacement is chosen as the displacement closest to the current position. If a solution is found, the method exits and controls the vehicle according to other embodiments of the invention. If there is no sequence of displacements resulting in a collision-free solution, another desired speed 1609 is selected, and the method performs another iteration.

In one embodiment, the path planner determines the trajectory by optimizing a cost function of the motion of the vehicle within the union of collision free regions. For instance, in one embodiment, the cost of transitioning between different displacements at time steps of control is determined as a combination of the deviation from the middle of the lane and the distance to surrounding obstacles.

Figure 17:
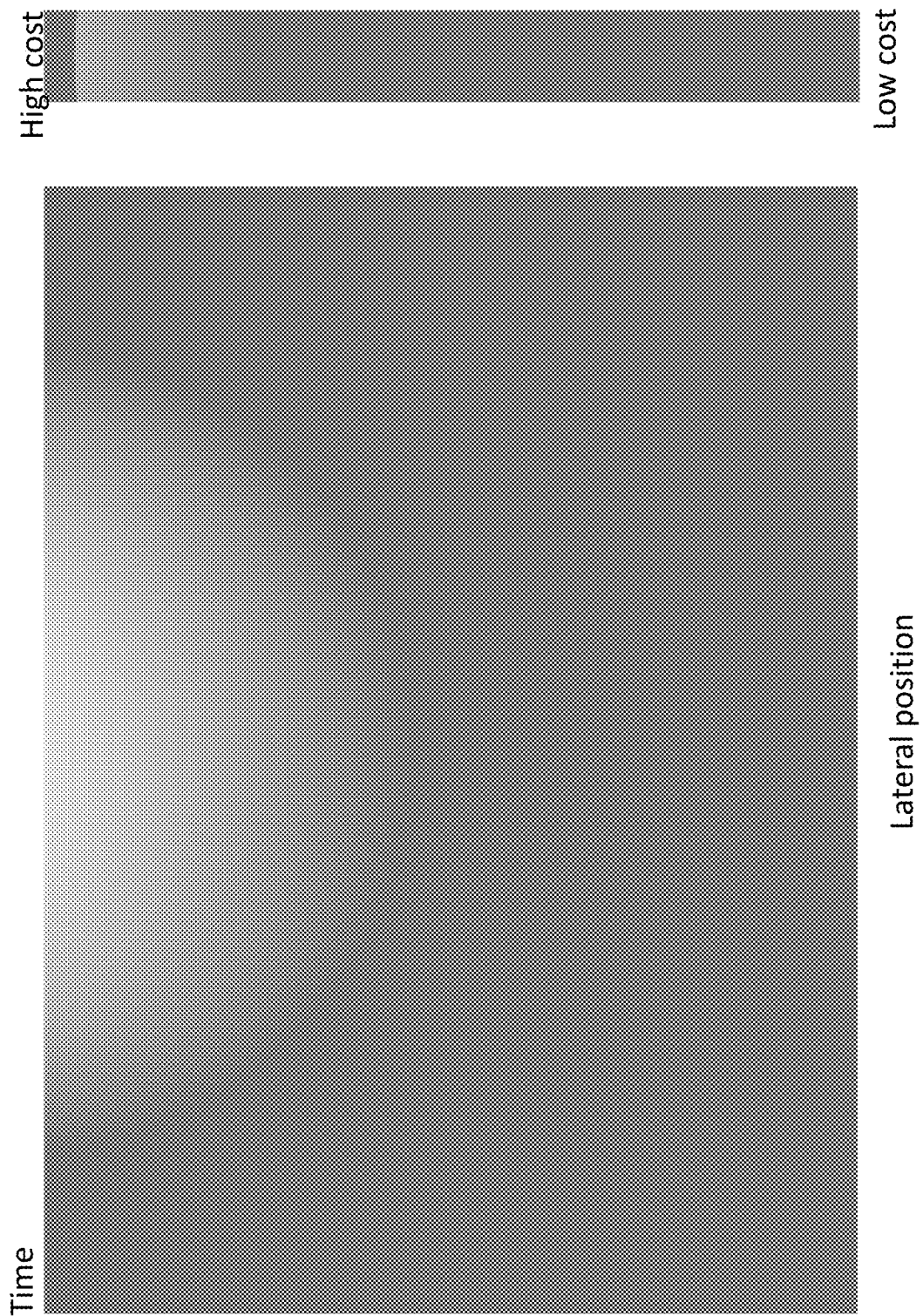
FIG. 17 shows an illustration of the choice of cost function for the state transitions.

FIG. 17 shows an illustration of the choice of cost function for the state transitions used by one embodiment. For instance, the road can be a two-lane singe-directed road. The cost of transitioning to a lateral displacement corresponding to in between the lanes is increased as the time steps of control is increased, and the cost of staying close to any of the middle of the lanes is kept low. Doing in such a manner ensures that the path planner prefers to change lane early on, which increases the distance to other objects on the road.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Additionally, or alternatively, the above-described embodiments can be implemented as a non-transitory computer readable storage medium embodied thereon a program executable by a processor for performing a method of various embodiments.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A control system of a vehicle for controlling motion of the vehicle traveling on a road shared with a set of moving objects, comprising:

a memory to store a set of equilibrium points defining lateral displacements on the road traveled by the vehicle and to store a set of regions of states of lateral dynamic of the vehicle corresponding to the set of equilibrium points, wherein each state of lateral dynamic includes a lateral displacement, a rate of change of the lateral displacement, a lateral orientation, and a rate of change of the lateral orientation, wherein each region defines a control invariant set of the states of the lateral dynamic determined for different speeds of the vehicle, such that the vehicle having a state within a region determined for a speed is capable to maintain its states within the region while moving with the speed, wherein each region covers a multitude of states, includes a corresponding equilibrium point and intersects with at least one adjacent region, and wherein each equilibrium point is associated with one or multiple regions determined for different speeds;

at least one sensor to generate a time-series signal indicative of a motion trajectory of each object in the set of moving objects on a road shared with the vehicle;

at least one processor configured to execute modules of the control system including a collision detector and a path planner, wherein the collision detector is configured to detect a collision of each region determined for a first speed with at least one object in the set of moving objects at each time step of control in a time horizon when the motion trajectory of the object at the time step of control intersects a space defined by a longitudinal displacement of the vehicle at the time step of control and a range of values of the lateral displacement of the region to produce a data structure indicating collision-free regions at different time steps of control, such that each region is predetermined before the execution of the collision detector and is tested by the collision detector multiple times for collision at different longitudinal displacements of the vehicle at different time steps of control; and the path planner is configured to determine a time sequence defining a collision free sequence of regions forming a union of regions in space and time connecting a region including an initial displacement with a region including a target displacement to produce a trajectory within the union connecting the initial displacement with the target displacement; and a controller for controlling the vehicle according to the trajectory, wherein for any arbitrary state inside of any region of states of lateral dynamic of the vehicle stored in the memory and defined by the control invariant set, the controller is configured to control the vehicle from the arbitrary state within a region to the equilibrium point of the region along a trajectory of states located within the region.

2. The system of claim 1, wherein the collision detector detects a collision of each region determined for a second speed, when the path planner fails to determine the time sequence defining the collision free sequence of regions determined for the first speed, and wherein the path planner determines the collision free sequence of regions determined for the second speed to control the vehicle.

3. The system of claim 2, wherein the collision detector iterates through different values of the speed until a value of the speed for which the collision free sequence of regions determined for that value of the speed is found.

4. The system of claim 2, wherein the first speed is a current speed of the vehicle.

5. The system of claim 2, wherein a region determined for an equilibrium point representing a current displacement of the vehicle covers a sequence of speeds including the first speed and the second speed.

6. The system of claim 2, wherein the collision detector determines the obstacle locations with respect to the first speed by calculating future states of the vehicle moving with the first speed, and determines the obstacle locations with respect to the second speed by adjusting the future states of the vehicle moving with the first speed based on a difference between the first speed and the second speed.

7. The system of claim 2, wherein the speeds for determining regions are selected such that the regions corresponding to different speeds at similar lateral displacements overlap for at least one speed.

8. The system of claim 2, wherein the speeds are tested iteratively in decreasing order starting from a maximum speed corresponding to a speed limit.

9. The system of claim 1, wherein the memory stores a data structure indicative of a state transition graph defining possible transitions between regions for different time steps of control determined for the same and different speeds without considering obstacles, and wherein the collision detector invalidates at least some transitions on the graph in response to detecting the obstacles to form the data structure indicating the collision-free regions, and wherein the path planner searches through the valid transitions of the graph to find the union of regions.

10. The system of claim 1, wherein the data structure indicative of the state transition graph includes an upper block-diagonal matrix.

11. The system of claim 1, wherein the collision detector estimates a future trajectory of the object consistent with the time-series signal indicative of the motion of the object, estimates a probability of intersection of the future trajectory with each region at each time step of control and detect the region at the time step of control as collision free if the probability of intersection is below a threshold.

12. The system of claim 1, wherein the collision detector is configured for
determining a set of feasible trajectories of hypothetical objects moving in a driving area of the vehicle;
determining a probability of each feasible trajectory to intersect with each region at each time step of control;
determining, using the time-series signals, a probability of each feasible trajectory to be followed by at least one object;
determining a level of risk of intersection of each feasible trajectory with each region at each time step of control as a combination of the probability of the feasible trajectory to intersect with each region at each time step of control and the probability of the feasible trajectory to be followed by at least one object; and
detecting a region at a time step of control as collision free if the level of risk of intersection of all feasible trajectories with the region at the time step of control is below a threshold.

13. The method of claim 1, wherein the feasible trajectories are determined using a kinematic model of a motion of a hypothetical vehicle, comprising:
generating the feasible trajectories for different speeds of the hypothetical vehicles at different locations of the environment traveling with different driving intentions selected from a set of driving intentions.

14. The system of claim 1, further comprising:
a speedometer to measure a current speed of the vehicle, wherein the collision detector determines the longitudinal displacement of the vehicle at the time step of control based on a product of the current speed with a time period corresponding to the time step of control.

15. A control method for controlling motion of a vehicle traveling on a road shared with a set of moving objects, wherein the method uses at least one processor coupled to a memory configured to store a set of equilibrium points defining lateral displacements on the road traveled by the vehicle and to store a set of regions of states of lateral dynamic of the vehicle corresponding to the set of equilibrium points, wherein each state of lateral dynamic includes a lateral displacement, a rate of change of the lateral displacement, a lateral orientation, and a rate of change of the lateral orientation, wherein each region defines a control invariant set of the states of the lateral dynamic determined for different speeds of the vehicle, such that the vehicle having a state within a region determined for a speed is capable to maintain its states within the region while moving with the speed, wherein each region covers a multitude of states, includes a corresponding equilibrium point and intersects with at least one adjacent region, and wherein each equilibrium point is associated with one or multiple regions determined for different speeds, wherein the processor is coupled with stored instructions implementing the method, wherein the instructions, when executed by the processor carry steps of the method, comprising:
generating a time-series signal indicative of a motion trajectory of each object in the set of moving objects on a road shared with the vehicle;
detecting a collision of each region determined for a first speed with at least one object in the set of moving objects at each time step of control in a time horizon when the motion trajectory of the object at the time step of control intersects a space defined by a longitudinal displacement of the vehicle at the time step of control and a range of values of the lateral displacement of the region to produce a data structure indicating collision-free regions at different time steps of control, such that each region is predetermined and tested for collision at different longitudinal displacements of the vehicle at different time steps of control;

determining a time sequence defining a collision free sequence of regions forming a union of regions in space and time connecting a region including an initial displacement with a region including a target displacement to produce a trajectory within the union connecting the initial displacement with the target displacement; and controlling the vehicle according to the trajectory, wherein for any arbitrary state inside of any region of states of lateral dynamic of the vehicle stored in the memory and defined by the control invariant set, the vehicle can be controlled from the arbitrary state within a region to the equilibrium point of the region along a trajectory of states located within the region.

* * * * *